United States Patent
Winder et al.

(10) Patent No.: US 7,702,016 B2
(45) Date of Patent: *Apr. 20, 2010

(54) SYSTEM AND PROCESS FOR COMPRESSING AND DECOMPRESSING MULTIPLE, LAYERED, VIDEO STREAMS OF A SCENE CAPTURED FROM DIFFERENT VIEWPOINTS FORMING A GRID USING SPATIAL AND TEMPORAL ENCODING

(75) Inventors: Simon Winder, Seattle, WA (US); Matthew T. Uyttendaele, Seattle, WA (US); Charles Lawrence Zitnick, III, Seattle, WA (US); Richard Szeliski, Redmond, WA (US); Sing Bing Kang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1420 days.

This patent is subject to a terminal disclaimer.

(21) Appl. No.: 11/097,533

(22) Filed: Mar. 31, 2005

(65) Prior Publication Data

US 2006/0031915 A1    Feb. 9, 2006

Related U.S. Application Data

(63) Continuation-in-part of application No. 10/910,077, filed on Aug. 3, 2004.

(51) Int. Cl.
*H04B 1/66* (2006.01)
*H04N 7/12* (2006.01)
*H04N 11/02* (2006.01)
*H04N 11/04* (2006.01)
*H04N 5/14* (2006.01)
*H04N 9/64* (2006.01)

(52) U.S. Cl. ............... 375/240.12; 375/240.01; 375/240.03; 375/240.24; 375/240.23; 382/233; 382/236; 382/250; 382/166; 348/700

(58) Field of Classification Search ............ 375/240.12, 375/240.01, 240.24
See application file for complete search history.

(56) References Cited

U.S. PATENT DOCUMENTS 5,825,421 A * 10/1998 Tan ................ 375/240.15

(Continued)

OTHER PUBLICATIONS

Buehler, C., M. Bosse, L. McMillan, S. Gortler, and M. Cohen, Unstructured lumigraph rendering, *Proceedings of SIGGRAPH 2001*, pp. 425-432.

(Continued)

*Primary Examiner*—Andy S Rao
*Assistant Examiner*—Jessica Roberts
(74) *Attorney, Agent, or Firm*—Lyon & Harr, LLP; Richard T. Lyon

(57) ABSTRACT

A system and process for compressing and decompressing multiple video streams depicting substantially the same dynamic scene from different viewpoints that from a grid of viewpoints. Each frame in each contemporaneous set of video frames of the multiple streams is represented by at least a two layers—a main layer and a boundary layer. Compression of the main layers involves first designating one or more of these layers in each set of contemporaneous frames as keyframes. For each set of contemporaneous frames in time sequence order, the main layer of each keyframe is compressed using an inter-frame compression technique. In addition, the main layer of each non-keyframe within the frame set under consideration is compressed using a spatial prediction compression technique. Finally, the boundary layers of each frame in the current frame set are each compressed using an intra-frame compression technique. Decompression is generally the reverse of the compression process.

16 Claims, 16 Drawing Sheets

U.S. PATENT DOCUMENTS 6,700,933 B1 * 3/2004 Wu et al. .............. 375/240.16
2006/0153304 A1 * 7/2006 Prakash et al. ......... 375/240.25

OTHER PUBLICATIONS

Carceroni, R. L., and K. Kutulakos, Multi-view scene capture by surfel sampling: From video streams to non-rigid 3D motion, shape and reflectance, *Eighth International Conference on Computer Vision*, vol. II, pp. 60-67.

Carranza, J., C. Theobalt, M. Magnor, and H.-P. Seidel, Free-viewpoint video of human actors, *ACM Transactions on Graphics*, vol. 22, No. 3, pp. 569-577.

Chai, B.-B., S. Sethuraman, H. S. Sawhney, P. Hatrack, Depth map compression for real-time view-based rendering, *Pattern Recognition Letters*, 2004, vol. 25, No. 7, pp. 755-766.

Chang, C.-L., X. Zhu, P. Ramanathan, and B. Girod, Inter-view wavelet compression of light fields with disparity-compensated lifting, *SPIE Visual Communications and Image Processing*, 2003, *Invited Paper*.

Chuang, Y.-Y., B. Curless, D. Salesin, and R. Szeliski, a Bayesian approach to digital matting, *Conf. on Comp. Vision and Pattern Recognition*, 2001, vol. II, pp. 264-271.

Debevec, P.E., C. J. Taylor, and J. Malik, Modeling and rendering architecture from photographs: A hybrid geometry- and image-based approach, *Computer Graphics (SIGGRAPH'96)*, Aug. 1996, pp. 11-20.

Debevec, P.E., Y. Yu, and G. Borshukov, Efficient view-dependent image-based rendering with projective texture mapping, *Ninth Eurographics Rendering Workshop*, Vienna, Austria, Jun. 1998.

Gortler, S.J., R. Grzeszczuk, R. Szeliski, and M. F. Cohen, The lumigraph, *ACM SIGGRAPH Comp. Graphics Proceedings, Annual Conference Series*, pp. 43-54.

Grammalidis, N., M. G. Strintzis, Sprite generation and coding in multiview image sequences, *IEEE Transactions on Circuits and Sys. for Video Tech.*, Mar. 2000, vol. 10, No. 2, pp. 302-311.

Hall-Holt, O., and S. Rusinkiewicz, Stripe boundary codes for real-time structured-light range scanning of moving objects, *Eighth Int'l. Conf. on Comp. Vision*, vol. II, pp. 359-366.

Heigl, B., R. Koch, M. Pollefeys, J. Denzler, L. Van Gool, Plenoptic modeling and rendering from image sequences taken by hand-held camera, *DAGM'99*, pp. 94-101.

Kanade, T., P. W. Rander, and P. J. Narayanan, Virtualized reality: constructing virtual worlds from real scenes, *IEEE MultiMedia Magazine*, Jan.-Mar. 1997, vol. 1, No. 1, pp. 34-47.

Krishnamurthy, R., B.-B. Chai, H. Tao, S.Sethuraman, Compression and transmission of depth maps for image-based rendering, *Int'l Conf. on Image Processing*, 2001, vol. 3, pp. 828-831.

Levoy, M. and P. Hanrahan, Light field rendering, *ACM SIGGRAPH Comp. Graphics Proceedings, Annual Conference Series*, Aug. 1996, pp. 31-42.

Lim, J., K. N. Ngan, W. Yang, K. Sohn, A multiview sequence CODEC with view scalability, *Signal Processing: Image Communication*, 2004, vol. 19, pp. 239-256.

Pulli, K., M. Cohen, T. Duchamp, H. Hoppe, L. Shapiro, and W. Stuetzle, View-based rendering, *Eurographics Workshop on Rendering*, 1997, pp. 23-34.

Scharstein, D., and R. Szeliski, A taxonomy and evaluation of dense two-frame stereo correspondence algorithms, *Int'l. J. of Comp. Vision*, vol. 47, No. 1, pp. 7-42.

U.S. Appl. No. 10/880,774, filed Jun. 28, 2004, Kang et al.
U.S. Appl. No. 10/879,327, filed Jun. 28, 2004, Zitnick et al.
U.S. Appl. No. 10/879,235, filed Jun. 28, 2004, Zitnick et al.
U.S. Appl. No. 10/910,088, filed Aug. 3, 2004, Uyttendaele et al.

Seitz, S. M., and C. M. Dyer, Photorealistic scene reconstruction by voxel coloring, *CVPR'97*, Jun. 1997, pp. 1067-1073.

Shade, J., S. Gortler, L.-W. He, and R. Szeliski, Layered depth images, *Comp. Graphics (SIGGRAPH '98) Proceedings*, Jul. 1998, pp. 231-242.

Szeliski, R., Scene reconstruction from multiple cameras, *Int'l Conf. on Image Processing (ICIP-2000)*, Vancouver, Sep. 2000, vol. I, pp. 13-16.

Tao, H., H. Sawhney, and R. Kumar, A global matching framework for stereo computation, *Eighth Int'l. Conf. on Comp. Vision*, vol. I, pp. 532-539.

Torr, P., R. Szeliski, and P. Anandan, An integrated Bayesian approach to layer extraction from image sequences, *IEEE Trans. on Pattern Analysis and Mach. Intelligence*, 2001, vol. 23, No. 3, pp. 297-303.

Vedula, S., S. Baker, S. Seitz, and T. Kanade, Shape and motion carving in 6D, *Conf. on Comp. Vision and Patten Recognition*, vol. II, pp. 592-598.

Wexler, Y., A. Fitzgibbon, and A. Zisserman, Bayesian estimation of layers from multiple images, *Seventh European Conf. on Comp. Vision*, vol. III, pp. 487-501.

Wilburn, B., M. Smulski, H. K. Lee and M. Horowitz, The light field video camera, *SPIE Electronic Imaging: Media Processors*, vol. 4674, pp. 29-36.

Yang, J. C., M. Everett, C. Buehler, and L. McMillan, A real-time distributed light field camera, *Thirteenth Eurographics Workshop on Rendering*, 2002, pp. 77-85.

Zhang, L., B. Curless, and S. M. Seitz, Spacetime stereo: Shape recovery for dynamic scenes, *Conf. on Comp. Vision and Pattern Recognition*, 2003, pp. 367-374.

Zhang, Y., and C. Kambhamettu, on 3D scene flow and structure estimation, *Conf. on Comp. Vision and Pattern Recognition*, 2001, vol. II, pp. 778-785.

Zhang, Z. A flexible new technique for camera calibration, *Technical Report: MSR-TR-98-71*, Microsoft Research, Redmond, WA.

Ziegler, G., H. Lensch, N. Ahmed, M. Magnor, and H.-P. Seidel, Multi-video compression in texture space, *IEEE International Conference on Image Processing (ICIP'04)*, 2004, (accepted for publication).

Ziegler, G., H. Lensch, M. Magnor, and H.-P. Seidel, Multi-video compression in texture space using 4D SPIHT, *IEEE Int'l. Workshop on Multimedia and Signal Processing, (MMSP'04)*, 2004, (accepted for publication).

* cited by examiner

SYSTEM AND PROCESS FOR COMPRESSING AND DECOMPRESSING MULTIPLE, LAYERED, VIDEO STREAMS OF A SCENE CAPTURED FROM DIFFERENT VIEWPOINTS FORMING A GRID USING SPATIAL AND TEMPORAL ENCODING

CROSS-REFERENCE TO RELATED APPLICATIONS

This application is a continuation-in-part of a prior application entitled "A System And Process For Compressing And Decompressing Multiple, Layered, Video Streams Employing Spatial And Temporal Encoding" which was assigned Ser. No. 10/910,077 and filed Aug. 3, 2004.

BACKGROUND

1. Technical Field

The invention is related to compressing and decompressing video, and more particularly to a system and process for compressing and decompressing multiple, layered, video streams employing spatial and temporal encoding.

2. Background Art

For several years now, viewers of TV commercials and feature films have been seeing the "freeze frame" effect used to create the illusion of stopping time and changing the camera viewpoint. The earliest commercials were produced by using a film-based system, which rapidly jumped between different still cameras arrayed along a rail to give the illusion of moving through a frozen slice of time.

When it first appeared, the effect was fresh and looked spectacular, and soon it was being emulated in many productions, the most famous of which is probably the "bullet time" effects seen in the movie entitled "The Matrix". Unfortunately, this effect is a one-time, pre-planned affair. The viewpoint trajectory is planned ahead of time, and many man hours are expended to produce the desired interpolated views. Newer systems are based on video camera arrays, but still rely on having many cameras to avoid software view interpolation.

Thus, existing systems would not allow a user to interactively change to any desired viewpoint while watching a dynamic image-based scene. Most of the work on image-based rendering (IBR) in the past involves rendering static scenes, with two of the best-known techniques being Light Field Rendering [5] and the Lumigraph [3]. Their success in high quality rendering stems from the use of a large number of sampled images and has inspired a large body of work in the field. One exciting potential extension of this groundbreaking work involves interactively controlling viewpoint while watching a video. The ability of a user to interactively control the viewpoint of a video enhances the viewing experience considerably, enabling such diverse applications as new viewpoint instant replays, changing the point of view in dramas, and creating "freeze frame" visual effects at will.

However, extending IBR to dynamic scenes is not trivial because of, among other things, the difficulty (and cost) of synchronizing so many cameras and acquiring the images. One of the earliest attempts at capturing dynamic scenes was Kanade et al.'s Virtualized Reality system [4], which involved 51 cameras arranged around a 5-meter geodesic dome. Carranza et al. [1] used seven synchronized cameras distributed around a room looking towards its center to capture 3D human motion. Yang et al. [7] designed an 8×8 grid of cameras (each 320×240) for capturing a dynamic scene.

Compressing the video data to a workable size for transmission or storage, and then decompressing the compressed data in an efficient and quick manner with acceptable quality, is also a difficult problem. Compression is needed as even if only a few cameras are employed in capturing the video data, the amount of data is extremely large (e.g., on the order of 800 MB per second for 8 cameras at 15 fps). Essentially, the amount of data involved is too large to efficiently transmit over a computer network given current typical bandwidth resources. Further, storage of the data is problematic if using currently popular storage media. For example, the storage capability of a current DVD could be easily exceeded. Thus, compression of the video data is needed to make distribution practical. In addition, the compression scheme should allow the data to be recovered in substantially real-time in order to support the rendering of the captured scene from a viewer-selected viewpoint. Current video compression techniques can be employed but would not be efficient enough to provide the necessary compression ratio to facilitate distribution of the video data or its substantially real-time decompression. One recent attempt at compressing video streams from multiple cameras involved a proofing of concept for storing dynamic light fields. Namely, Wilburn et al. [6] demonstrated that it is possible to synchronize six video cameras, and compress and store all the image data in real time. They have since hooked up 128 cameras. Chang et al. [2] is another example of compressing video streams from multiple cameras using a light field encoding approach. In another attempt, Ziegler et al. [8] exploited the high degree of redundancy inherent in multiple video streams depicting the same dynamic scene, especially as between the streams, to compress the data using a texture domain approach.

The present invention tackles this problem of compression and decompressing multiple video streams of the same dynamic scene in a different and efficient manner.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". A listing of references including the publications corresponding to each designator can be found at the end of the Detailed Description section.

SUMMARY

The present invention is directed toward a system and process for compressing and decompressing multiple video streams depicting substantially the same dynamic scene. To facilitate the explanation of the present system and process, the multiple video streams can be characterized as being video data that is made up of sequential sets of contemporaneous video frames. Each frame in a set depicts substantially the same scene but from different viewpoints, which form a grid of viewpoints. In addition, each frame is represented by at least a two layers. In one embodiment of the present system and process, a main layer and a boundary layer are employed to represent each frame of the video data. The main layer has significantly more pixel data than the boundary layer. As a result the layers are compressed and decompressed differently.

In general, compression of the main layers of the frames involves first designating one or more of the main layers of the frames in each set of contemporaneous frames as keyframes. The keyframes are chosen such that each keyframe in any one set of contemporaneous frames has a viewpoint that is the same as a designated keyframe in all the other sets of contemporaneous frames. In one embodiment of the invention, keyframes are also chosen such that no frame in a set of contemporaneous frames has a viewpoint that is more than a prescribed number of viewpoints away from the viewpoint of a designated keyframe in any direction on the grid of viewpoints. As will be described shortly the compression of a keyframe is more involved and requires more data bits than non-keyframes. As such, their number per set should be minimized. However, at the same time, as will be described shortly, non-keyframes are compressed using a close-by keyframe as a reference. Thus, the number of keyframes should not be so few that it has too little in common with the close-by keyframe, as this will adversely affect the quality of the restored frames. In tested embodiments, enough keyframes were chosen so that the aforementioned prescribed number of viewpoints that a non-keyframe could be from a keyframe would be no more than two.

With the keyframes designated, compression continues as follows. For each set of contemporaneous frames in time sequence order, the main layer of each keyframe in the set under consideration is compressed using an inter-frame compression technique. In addition, the main layer of each non-keyframe within the frame set under consideration is compressed using a spatial prediction compression technique. Finally, the boundary layers of each frame in the current frame set are compressed using an intra-frame compression technique.

It is noted that in one embodiment of the present invention, the main layer pixels are characterized by at least pixel color values and pixel disparity or depth values, and the boundary layer pixels are characterized by at least pixel color values, pixel alpha values and pixel disparity or depth values. Given this, the compression of the main layer of each keyframe using inter-frame techniques, can entail compressing the keyframe main layer using a non-predictive Intra-frame (I-frame) compression technique that encodes at a minimum, pixel color values, as well as pixel disparity or depth values, for the first video frame set and other subsequent frame sets on a prescribed periodic basis. These keyframes correspond to the I-frames of the inter-frame compression technique. In addition, the main layer of each keyframe in a set of frames not corresponding to an I-frame (e.g., the Inter, or P-frames) are compressed using a temporal prediction compression technique, based on the main layer of the keyframe exhibiting the same viewpoint in a preceding I-frame set. Here, the temporal prediction technique is designed to encode, at a minimum, pixel color values, as well as pixel disparity or depth values. In regard to the compression of the main layer of each non-keyframe within each set of contemporaneous frames, this entails using a spatial prediction compression technique that encodes at a minimum, pixel color values, as well as pixel disparity or depth values. The main layer of a keyframe which is no more than the aforementioned prescribed number of viewpoints away from the non-keyframe layer being compressed is used as a reference frame for the spatial prediction compression technique. And finally, in regard to compressing the boundary layer of each frame using an intra-frame compression technique, this entails using a non-predictive I-frame compression technique that encodes, at a minimum, pixel color values, pixel disparity or depth values, and pixel alpha values.

Decompression of video data which was compressed as described above is essentially the reverse of the compression process. Thus, the boundary layer of each frame, in each frame set in turn, is decompressed using an intra-frame decompression technique. In addition, the main layer of each keyframe, in each set of contemporaneous frames in turn, is decompressed using an inter-frame decompression technique. And finally, the main layer of each non-keyframe, within each set of contemporaneous frames in turn, is decompressed using a spatial prediction decompression technique.

In the embodiment where the main layer pixels are characterized by at least pixel color values and pixel disparity or depth values and the boundary layer pixels are characterized by at least pixel color values, pixel alpha values and pixel disparity or depth values, decompression is generally accomplished as follows. Decompression of the main layer of each keyframe using inter-frame techniques, entails decompressing the keyframe main layer using a non-predictive I-frame decompression technique that recovers, at a minimum, approximations of the original pixel color values and pixel disparity or depth values, for the frame sets associated with I-frames. The main layer of each keyframe in a set of frames not corresponding to I-frames are decompressed using a temporal prediction decompression technique based on the main layer of the keyframe exhibiting the same viewpoint in another frame set. This also recovers at a minimum, approximations of the original pixel color values and pixel disparity or depth values. As for the main layers of each non-keyframe within each set of contemporaneous frames, these are decompressed using a spatial prediction decompression technique which recovers at a minimum, approximations of the original pixel color values, as well as pixel disparity or depth values. Similar to the compression phase, this non-keyframe main layer decompression involves using the main layer of a keyframe which is no more than the prescribed number of viewpoints away from the main layer being decompressed as a reference frame for the spatial prediction decompression technique. Finally, decompressing the boundary layer of each frame in each frame set using an intra-frame decompression technique, involves using a non-predictive I-frame decompression technique which recovers at a minimum, approximations of the original pixel color values, pixel disparity or depth values, and pixel alpha values.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 INTERACTIVE VIEWPOINT VIDEO

The present system and process is used to compress and decompress interactive viewpoint video data, or other data having the same video frame form. In general, interactive viewpoint video is video in which a user can watch a dynamic scene while manipulating (freezing, slowing down, or reversing) time and changing the viewpoint at will. This video is generated using a relatively small number of cameras to simultaneously capture multiple views of a scene from different viewpoints to produce a set of contemporaneous frames of the video. This is done on a continuing basis to produce a sequence of these frame sets, which are then characterized using unique two-f layer frame representations, to form the video. While the generation of the interactive viewpoint video is beyond the scope of the present system and process, it is the subject of a co-pending application entitled "Interactive Viewpoint Video System And Process Employing Overlapping Images Of A Scene Captured From Viewpoints Forming A Grid", which was filed on Mar. 31, 2005 and assigned Ser. No. 11/097,542, and subsequently issued on Oct. 23, 2007 as U.S. Pat. No. 7,286,143.

In general, the co-pending application describes an interactive viewpoint video capture system which includes a bank of video cameras, arranged in a grid. In addition, the cameras have a convergent configuration such that each points generally toward the same target object or area in a scene with each camera's field of view overlapping the field of view of the adjacent camera or cameras by a prescribed amount (e.g., 30 degrees horizontal field of view per camera with relative rotation of 4-8 degrees between two adjacent cameras). The orientation of the cameras in relation to the target object or area can vary depending on the desired results. In other words, the distance each camera is away from the target object or area can vary. Thus, the grid of cameras need not be planar.

Figures 2A, 2B:
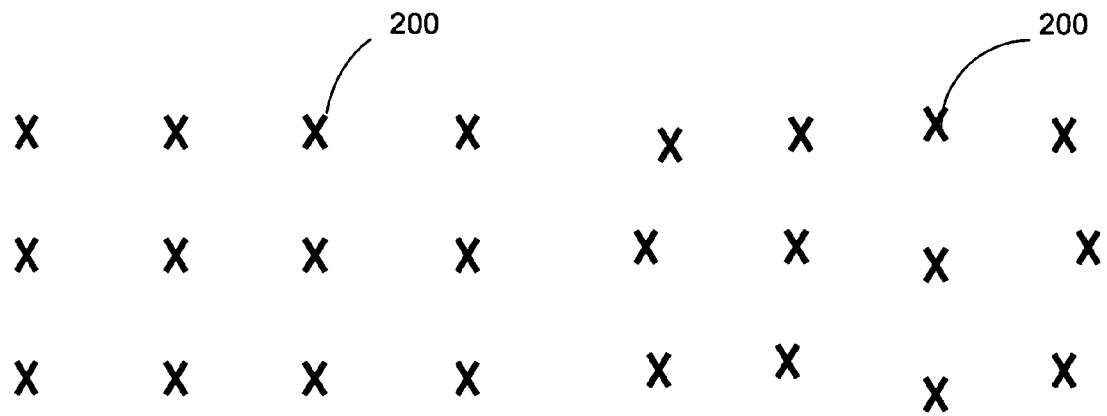
FIGS. 2(a)-(d) are diagrams showing a regular rectangular grid in FIG. 2(a), an irregular rectangular grid in FIG. 2(b), a regular triangular grid in FIG. 2(c) and an irregular triangular grid in FIG. 2(d).
Figures 2C, 2D:
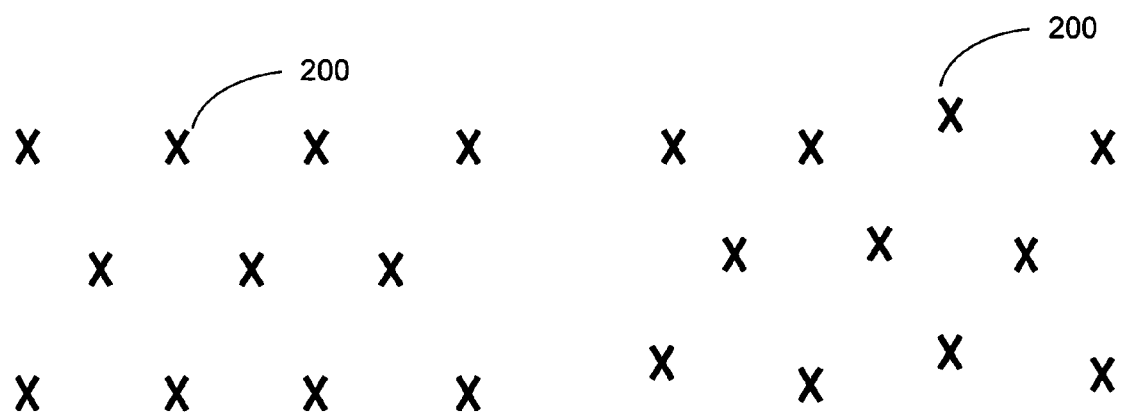

Further, the grid of cameras can be rectangular or triangular, and the placement pattern can be regular or irregular. For example, FIG. 2(a) illustrates a rectangular configuration with a regular placement pattern. In other words, when looking toward the center of the grid, the camera viewpoints 200 indicated by the X's appear to be lined up in straight columns and rows. FIG. 2(b) exemplifies a rectangular configuration with an irregular placement pattern. In this case, when looking toward the center of the grid, the viewpoints 200 are generally in columns and rows, but each viewpoint may be skewed so that they do not line up perfectly. FIG. 2(c) illustrates a triangular configuration with a regular placement pattern. Here, when looking toward the center of the grid, the viewpoints 200 appear to be lined up in horizontal rows, but diagonal columns. FIG. 2(d) exemplifies a triangular configuration with an irregular placement pattern. In this case, when looking toward the center of the grid, the viewpoints 200 are generally in the aforementioned horizontal row and diagonal column pattern, but each may be skewed so that they do not line up perfectly. It is noted that the number of camera viewpoints shown in the figures is arbitrary, and there can be more or less as desired.

This foregoing camera grid arrangement results in the user being able to view the scene from any vantage point along a surface connecting the camera viewpoints. Thus, it would appear to users as if they can pan and tilt across the scene, bounded only by the edges of the grid.

Another key feature of the interactive viewpoint video capture system is the real-time acquisition of synchronized video streams from the cameras. To accomplish this task, equipment capable of receiving and synchronizing the individual feeds from the cameras is advantageous, as is equipment for storing the synchronized video stream data. For example, real-time synchronization and storage of all the input videos can be handled by a series of concentrator units and a bank of hard drives. Each concentrator synchronizes the feed from a prescribed number of cameras (e.g., 4) and pipes the uncompressed video streams into the bank of hard drives through a fiber optic cable. The concentrators are synchronized (e.g., via a FireWire cable) to ensure all the video feeds are synchronous. In an alternative realization of the system, each camera could have its own recording device such as DV tape, VHS tape, etc. The video may then be transferred to hard disk after recording.

In addition to the capture and storing of video streams, the interactive viewpoint video capture system also includes a camera calibration program. The cameras are calibrated before every capture session to obtain all the camera attributes necessary for 3D reconstruction. These attributes including both geometric parameters (e.g., intrinsic and extrinsic camera parameters) and photometric parameters (e.g., exposure, white balance, vignetting). The camera parameters are stored and provided, along with the video streams, to the interactive viewpoint video generation program that will be described shortly.

The aforementioned two layer representations of each frame include a main layer and a boundary layer. The main layer has pixels exhibiting background colors and background disparities associated with correspondingly located pixels of depth discontinuity areas of the frame being represented, as well as pixels exhibiting colors and disparities associated with correspondingly located pixels of the frame not found in these depth discontinuity areas. The boundary layer is made up of pixels exhibiting foreground colors, foreground disparities and alpha values associated with the correspondingly located pixels of the depth discontinuity areas in the frame. The depth discontinuity areas correspond to prescribed sized areas surrounding depth discontinuities found in the frame. It is this two-layer frame data that the present invention is used to compress and decompress in a combined temporal and spatial manner.

The following sections will present details of the present compression and decompression (codec) system and process. A computing environment suitable for implementing the invention is presented first. This is followed by a description of the codec itself.

1.1 The Computing Environment

Figure 1:
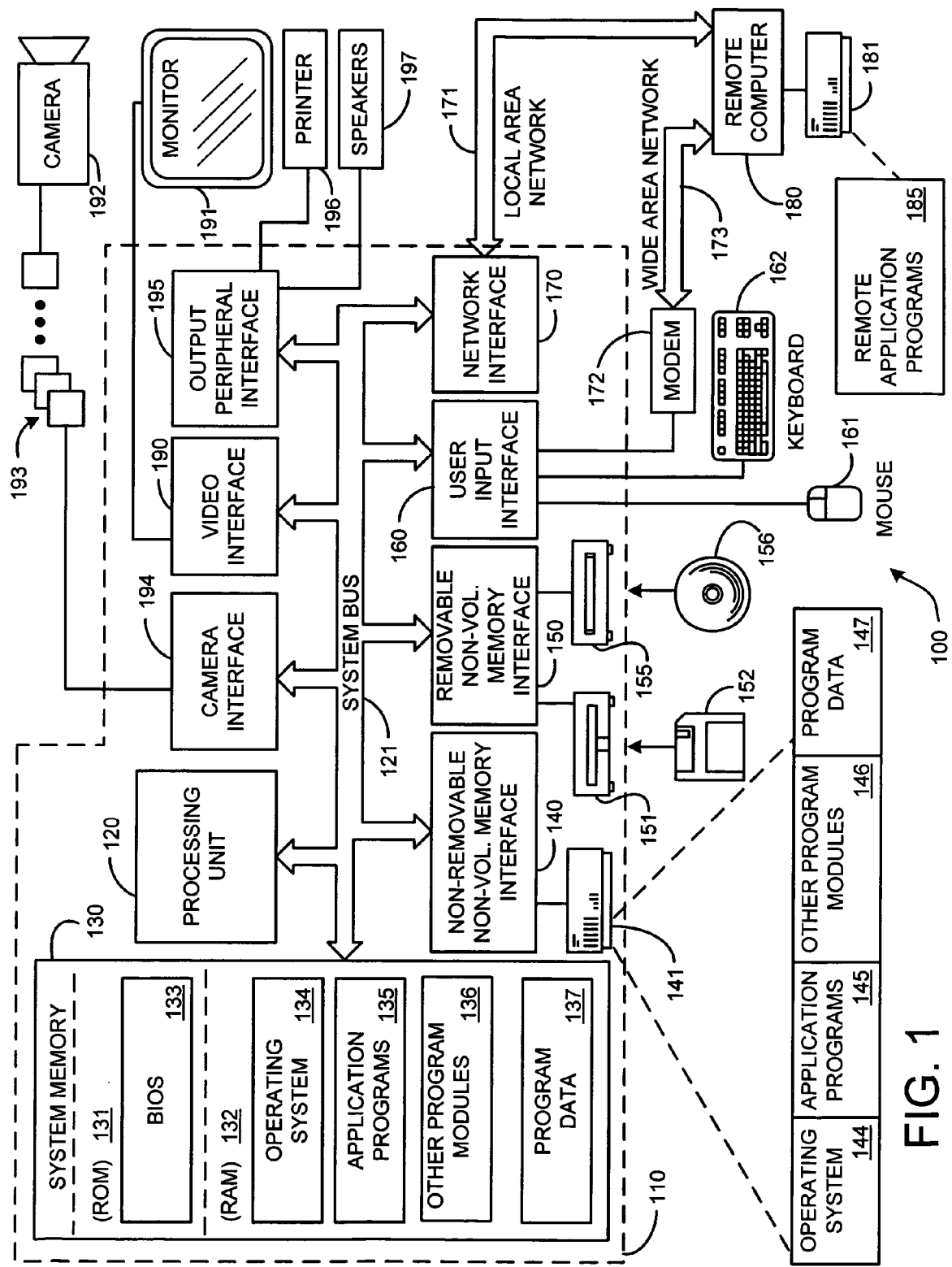
FIG. 1 is a diagram depicting a general purpose computing device constituting an exemplary system for implementing the present invention.

Before providing a description of the preferred embodiments of the present invention, a brief, general description of a suitable computing environment in which portions of the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the interactive viewpoint video system hardware, program module architecture and the modules themselves.

1.2.1 Compression

The previously described two layer frame data will represent a significant amount of data (e.g., on the order of 800 MB uncompressed for 8 cameras at 15 fps recording for 1 sec). The compression scheme according to the present invention is used to reduce this large amount of data to a manageable size and the decompression is designed to support fast playback. Because each camera is capturing part of the same scene, an opportunity exists to compress the data by exploiting the between-camera (i.e., spatial) redundancies, as well as temporally between successive frame sets. In general, the temporal compression aspects involve temporal prediction using motion compensated estimates from the preceding frame, while the spatial aspects involve spatial prediction using a reference camera's texture and disparity maps transformed into the viewpoint of a spatially adjacent camera. The differences are then coded between predicted and actual frames using a novel transform-based compression scheme that can simultaneously handle texture and disparity/depth data.

More particularly, the present codec compresses two kinds of information: RGBD data for the main layer of each frame (where the RGB refers to the red, green and blue color intensity values of each pixel as is conventional and D is the pixel disparity or depth) and RGBAD alpha-matted data for the boundary layer of the frame (where A is the pixel alpha value). For the former, both non-predicted (for I-frames) and predicted (for P-frames) compression is used, while for the latter, only non-predicted I-frames are used because the boundary layer data compresses extremely well owing to its sparseness and it is difficult to employ predictive coding due to the large changes in this boundary data between viewpoints.

Figure 3:
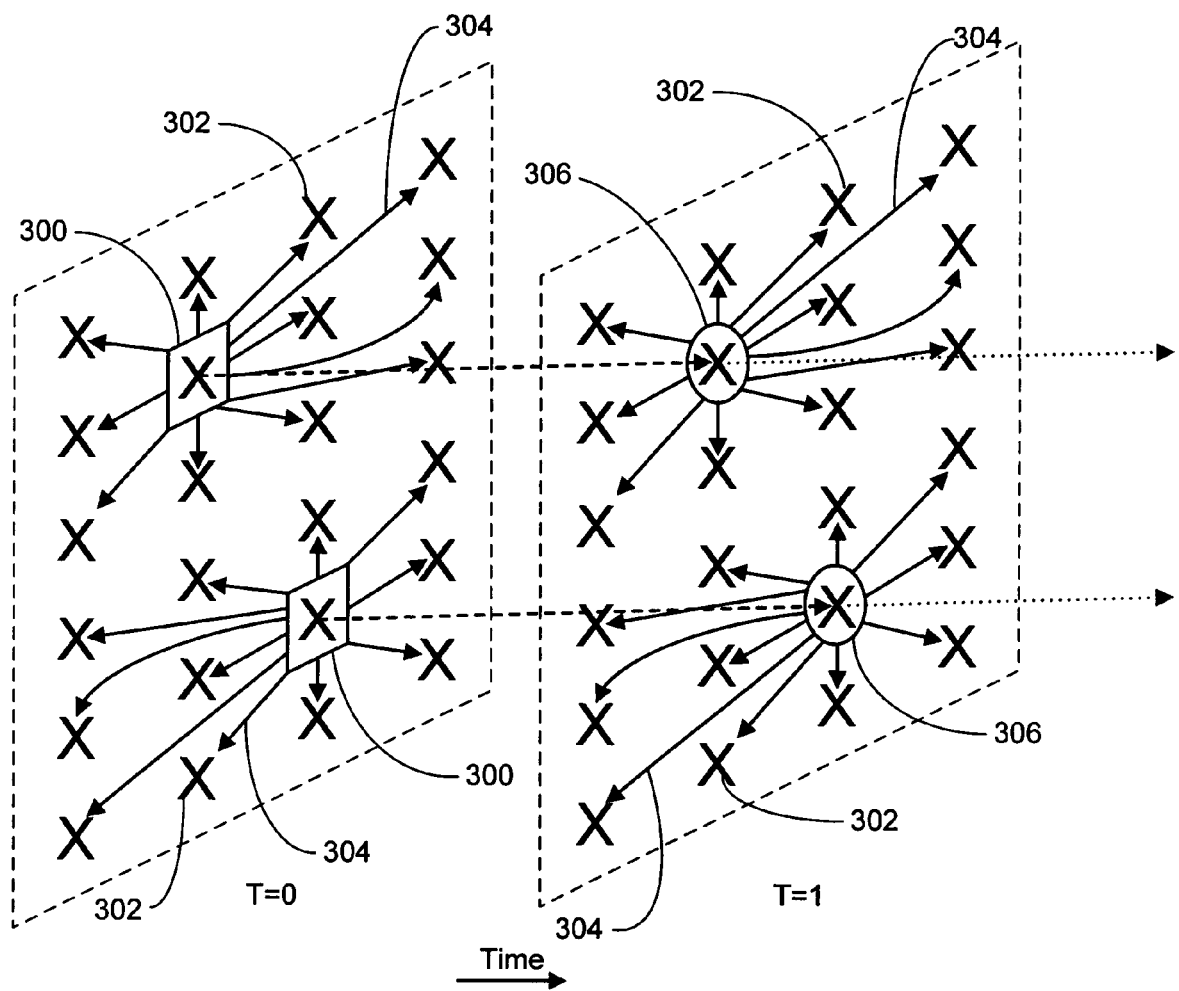
FIG. 3 is a block diagram illustrating how a main layer of each set of contemporaneously captured frames of the multi-stream video data are encoded using a hybrid temporal and spatial compression scheme in accordance with the present invention.

FIG. 3 illustrates how the main layer is coded and demonstrates the present hybrid temporal and spatial prediction scheme. Of the 24 camera viewpoints arrange in a grid (which in this example is a 4×6 regular rectangular grid), two keyframe camera views 300 are selected. The keyframe camera views 300 were chosen in tested embodiments of the present compression technique such that no non-keyframe camera view 302 was more than two camera positions away from a keyframe camera. Further, if after the keyframes 300 are chosen, a particular non-keyframe 302 could be associated with either one of two keyframes and still fall within the prescribed number of camera position away from the keyframes, the closer keyframe is associated with the non-keyframe. If the same situation exists and either keyframe 300 is the same distance away, then an arbitrary rule is established to associate the non-keyframe 302 with one of the nearby keyframes. Thus, in the example of FIG. 3, the camera viewpoint in the second row-second column of the grid was chosen as one of the keyframes 300, and the camera viewpoint in the fifth row-third column was chosen as another keyframe 300 to achieve this result. All the adjacent non-keyframes 302 were associated with one of them as shown in FIG. 3 by the lines 304 connecting them.

A different compression procedure is used when compressing the keyframes in comparison to the adjacent non-reference camera views. Referring again to FIG. 3, in regard to the keyframes 300, the texture (RGB) and disparity (D) data is initially compressed using the aforementioned non-predictive I-frame compression technique (I), as indicated previously. These I-frames are shown in FIG. 3 as an "X" surrounded by a box (in the example group of frames at T=0 in FIG. 3). The non-keyframe camera views 302 ($P_s$) are compressed using spatial prediction from nearby reference views. These non-keyframe viewpoints are shown in FIG. 3 as "Xs". This scheme was chosen because it minimizes the amount of information that must be decoded when data from adjacent camera pairs is selectively decompressed in order to synthesize novel views. For the next frame set in time (T=1 in the FIG. 3 example), motion compensation is used and the error signal is coded using a transform-based technique to obtain the temporal predicted frames 306 ($P_t$) for each I frame. These temporal predicted frames are shown in FIG. 3 as an "X" surrounded by a circle. In addition, the aforementioned predictive spatial compression is used to encode each non-keyframe view 302 in the new frame set under consideration based on a decoded version of a close-by $P_t$ frame 306. Thus, when decoding, the $P_t$ frame 306 is decoded first and then the $P_s$ 302 frames in the same frame set can be decoded using the $P_t$ frame. The foregoing compression scheme allows for fast decoding and decompression.

It is noted that the number of camera viewpoints and their grid arrangement shown in FIG. 3 is exemplary only. There can be more or less viewpoints, and the grid configuration could be different as well (e.g., irregular rectangular, regular triangular, or irregular triangular).

A more detailed description of the various aforementioned compression schemes will now be presented.

1.2.1.1 Compression of Main Layer Keyframes Using I-frames

As described previously, each component frame in each set of contemporaneously captured frames making up a "frame" of the interactive viewpoint video data is represented by a main layer comprising RGBD pixel values and a boundary layer comprising RGBAD pixel values. In addition, it was stated previously that the main layer keyframes are initially and periodically thereafter compressed using a non-predictive I-frame technique. This section describes that technique.

Figure 4A:
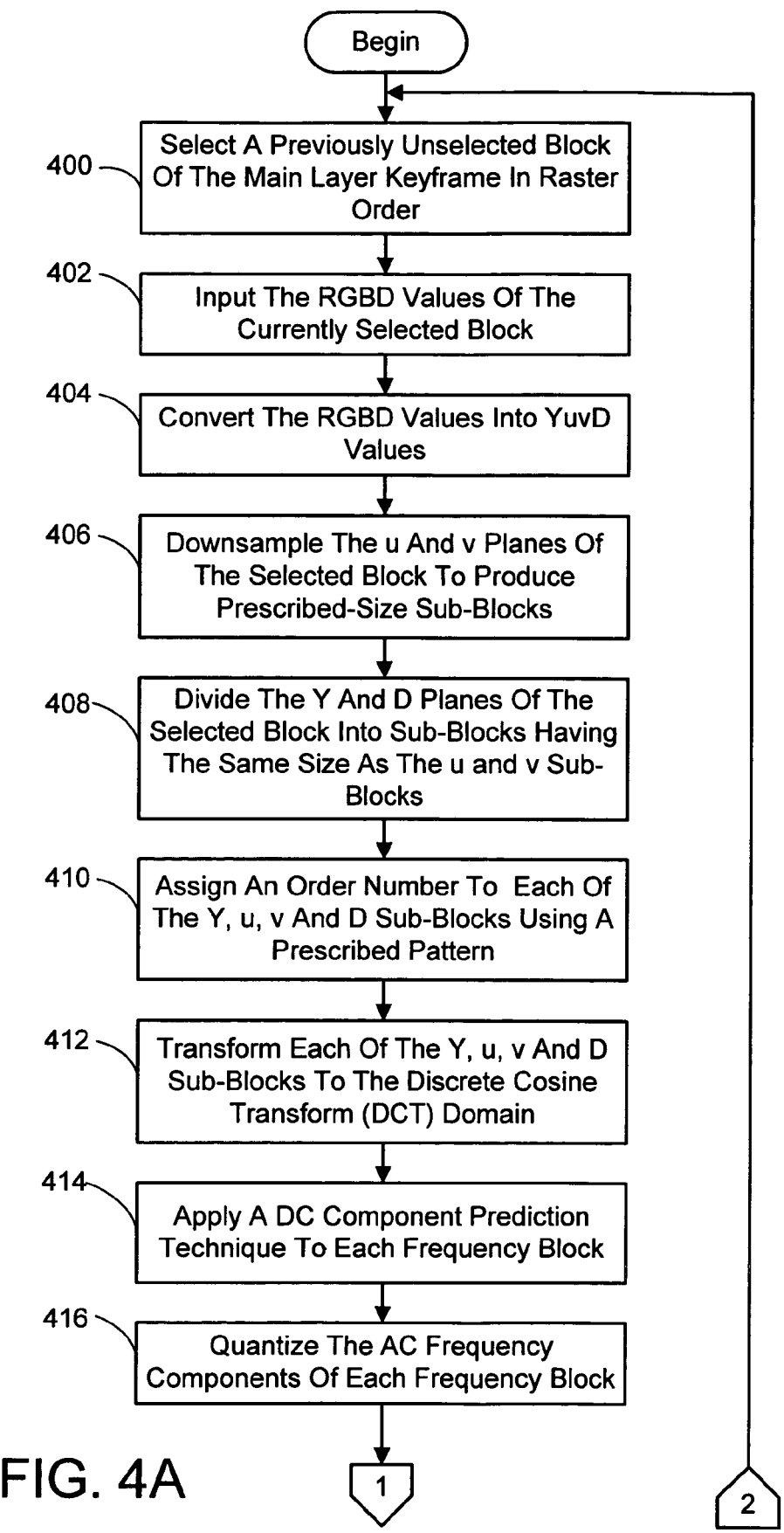
FIGS. 4A and 4B are a flow chart diagramming a process for compressing main layer keyframes using a non-predictive I-frame compression technique according to the present invention.
Figure 4B:
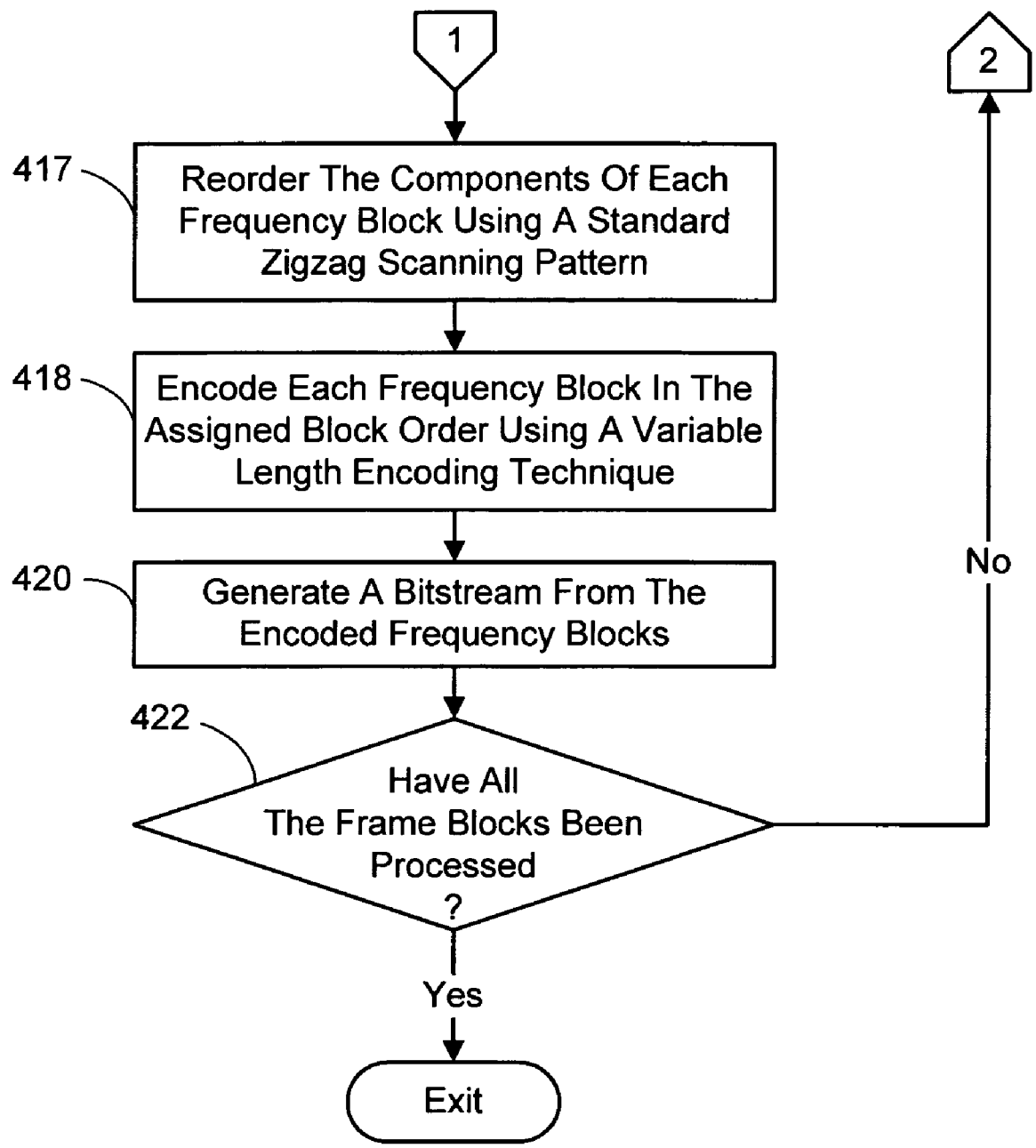

Referring to FIGS. 4A-B, the first action 400 in the non-predictive I-frame compression process is to select a previously unselected block of the main layer keyframe in raster order. In tested embodiments of this process, a 16×16 pixel block was used. However, other block sizes could be used as well. It is also noted that while a raster order was used in the tested embodiments, other block selection orders could be employed instead.

The RGBD values of the currently selected block are input (process action 402) and converted into Yuv values using standard methods (process action 404). In addition, the u and v planes of the selected block are downsampled to produce prescribed-size sub-blocks (process action 406). In tested embodiments the u and v planes were downsampled by a factor of two to produce an 8×8 pixel u sub-block and an 8×8 pixel v sub-block. Still further, the Y and D planes of the selected block are divided into sub-blocks that are the same size as the u and v sub-blocks (process action 408). In tested embodiments these planes were divided into four 8×8 quadrant sub-blocks.

Each of the Y, u, v and D sub-blocks is assigned an order number via a prescribed pattern (process action 410). In tested embodiments, the prescribed pattern involved starting with the Y plane and assigning order numbers 1 through 4, respectively, to the Y sub-blocks in raster order. The u sub-block is assigned number 5 and the v sub-block is assigned number 6. Finally, the sub-blocks of the D plane are assigned order numbers 7-10 in raster order. While other ordering patterns can be used, it is believed the pattern described above facilitates faster decompression.

Each of the Y, u, v and D sub-blocks is next transformed to the Discrete Cosine Transform (DCT) domain (process action 412). In tested embodiments, an integer approximation of DCT technique was employed to effect the transformation. The result of the transformation is a sequence of 8×8 blocks of frequency components. A DC component prediction technique is applied to each frequency block (process action 414). This involves replacing the DC component in each frequency block with a value representing the difference between a predicted DC component value and the actual value. This DC prediction was accomplished in tested embodiments using a switched DC prediction technique similar to the one specified in the MPEG4 standard, except that a pre-defined fixed quantization level is employed. The particular quantization level employed is application specific and is chosen to strike a balance between the quality of the decompressed frame and the number of bits needed to represent it. The purpose of the DC prediction action is to convert what typically would have been a relatively large DC component value requiring many bits to encode, into a value that is near zero, if the DC values of neighboring frequency blocks of the same plane are close to the same original value.

Next, in process action 416, the frequency components of each frequency block (except the DC component) are quantized to eliminate small noise-level values and reduce the amount of data that needs to be encoded. The ITU-T video coding standard H.263 quantization approach was employed in the tested embodiments. Each frequency block is then encoded in accordance with the previously assigned block order using a standard variable length encoding technique. In tested embodiments, this involved first reordering the components of each block using a standard zigzag scanning pattern (process action 417) and encoding them using a standard I-block variable length coding technique (process action 418), such as the MPEG4 Huffman encoding procedure.

A bitstream is generated from the encoded frequency values of the frequency blocks (process action 420). In tested embodiments, a modified version of the MPEG4 Coded Block Pattern (CBP) data structure was employed for this purpose. More particularly, a CBP header field is formed to include four sections—namely CBPY, CBPu, CBPv and CBPD sections. These sections correspond to the portion of the encoded data representing the Y, u, v and D planes, respectively. Essentially, each CBP"x" section indicates to the decoder if the frequency blocks representing the sub-blocks of a plane have any non-zero AC frequency components. The CBP"x" coding is the same as used in MPEG4 for the CBPY, CBPu, CBPv sections. As for the CBPD section, which is unique to the present invention, the coding employed for the CBPY section is adopted. The CBP header is followed by the encoded frequency components, except that in cases where all the AC components of a frequency block are zeros, only the DC difference value is included. Thus, the decoder can use the appropriate CBP"x" section of the CBP header to determine if there are any encoded AC frequency components for a particular block included in the data.

It is next determined if all the blocks of the frame being compressed have been processed (process action 422). If not, then process actions 400 through 422 are repeated until all the blocks are encoded, at which time the compression process ends for that frame. It is noted that each of the foregoing process actions could alternately be performed on each block of the frame being compressed before moving to the next action, rather than completing all the actions on a block by block basis.

The decompression process associated decoding a main layer keyframe encoded via the foregoing process will be described in the decompression section later in this description.

1.2.1.2 Compression of Main Layer Keyframes Using P-Frames

For main layer keyframes in the contemporaneous frame sets falling between the above-described I-frames, the predictive phase of a conventional inter-frame compression technique is employed. For example, tested embodiments used the P-frame generation approach of the MPEG4 standard. The only modification to this approach was the addition of the disparity values (D) since the main frame pixel data included this data. The D data is added in the same way as it was in the I-frame procedure described previously in that it is handled just like the Y data.

1.2.1.3 Compression of Non-Keyframe Main Layers

For main layer frames in each contemporaneous frame set that are not chosen as keyframes, a spatial prediction compression technique is used to compress them as mentioned earlier. In general, to carry out spatial prediction, the disparity data from a nearby keyframe is used to transform both the texture and disparity data into the viewpoint of the non-keyframe being compressed. This results in an approximation of the non-keyframe's data, which is then corrected by sending compressed difference information. Thus, the keyframes act as reference views for compressing the adjacent non-keyframes. The occlusion holes created during the camera view transformation are treated separately and the missing texture is coded without prediction using an alpha-mask. This gives clean results that could not be obtained with a conventional block-based P-frame codec.

Figure 5A:
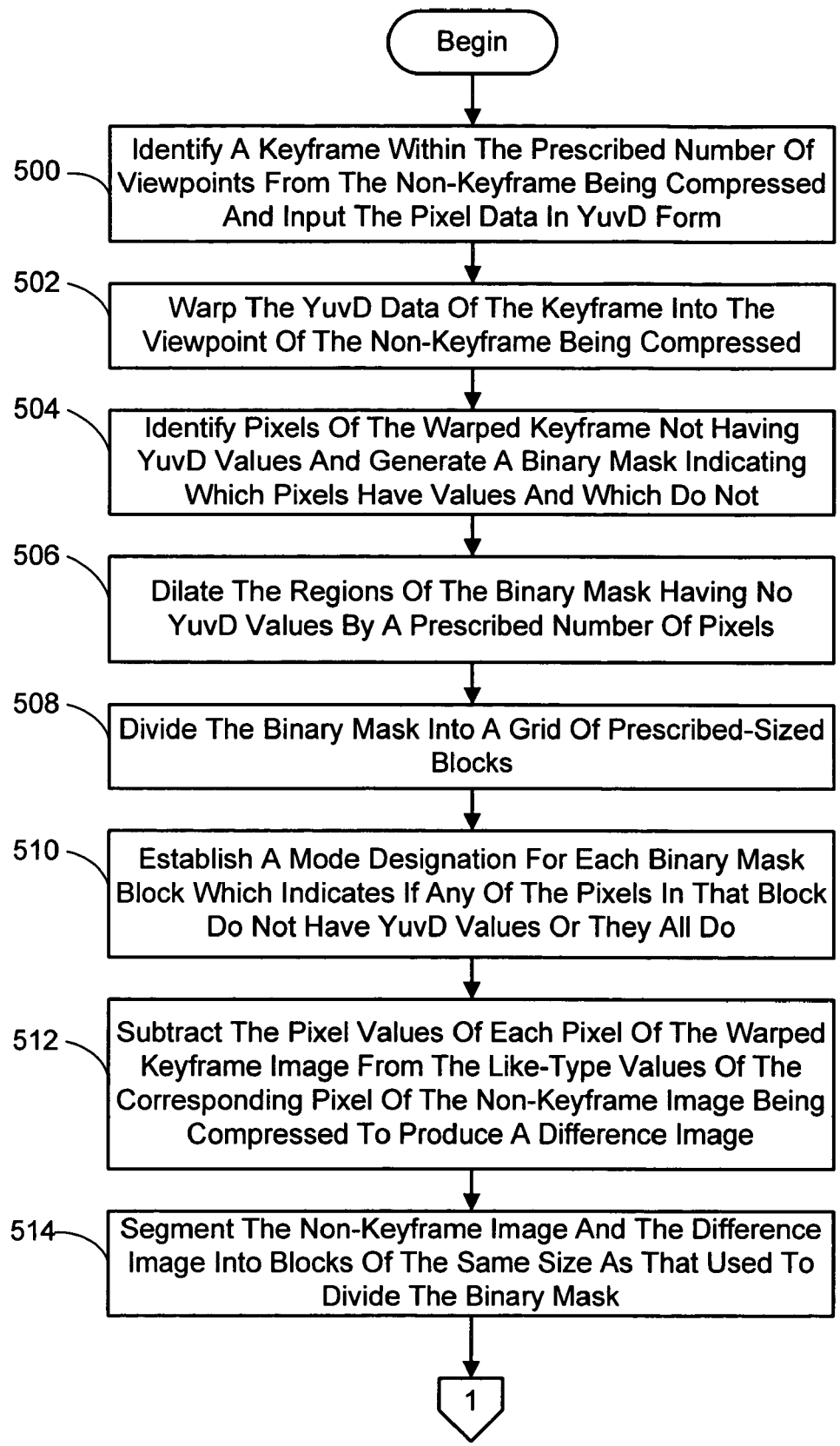
FIGS. 5A and 5B are a flow chart diagramming a process for compressing main layer non-keyframe images using a predictive spatial compression technique according to the present invention.
Figure 5B:
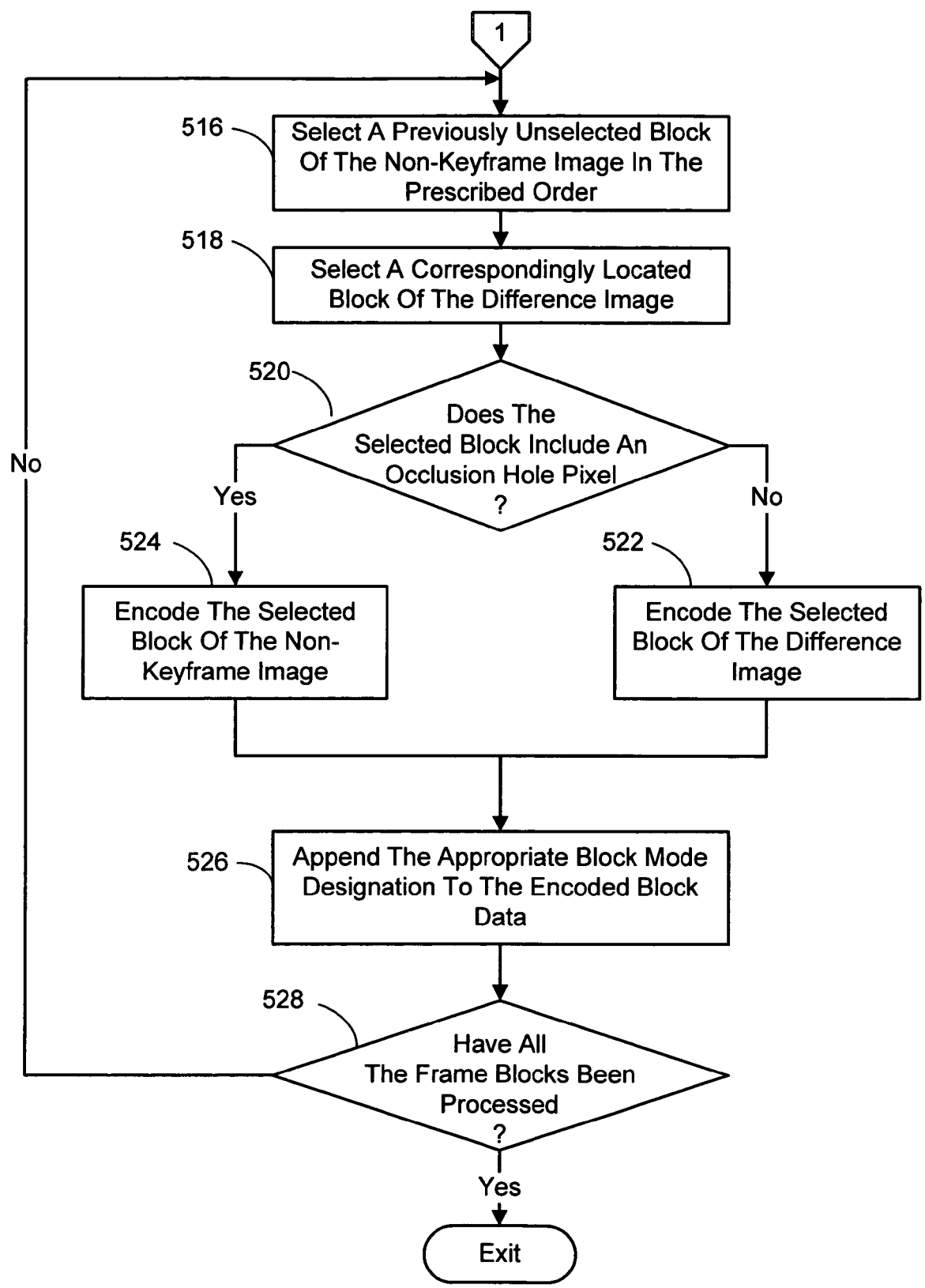

The spatial compression procedure will now be described in more detail as it pertains to each non-keyframe image in each of the aforementioned sets of contemporaneous frames. Referring to FIGS. 5A-B, a keyframe within a prescribed number of viewpoints from the non-keyframe being compressed is identified, and its pixel data in YuvD form, is input (process action 500). The disparity data (D) of the identified keyframe, and the camera parameters of the cameras used to capture the keyframe and the non-keyframe being compressed, are then used to transform both the texture and disparity data (YuvD) into the viewpoint of the non-keyframe being compressed (process action 502). It is noted that the camera parameter data is computed as part of the acquisition of the multiple video streams used to produce the sequential sets of contemporaneous frames and stored for used by the present compressing module, as well as the decompressing and rendering modules. The process used to "warp" the main layer of the keyframe to the viewpoint of the non-keyframe being compressed is accomplished using conventional methods. However, in tested embodiments of the present invention, a warping procedure described in a co-pending application entitled "A Real-Time Rendering System And Process For Interactive Viewpoint Video That Was Generated Using Overlapping Images Of A Scene Captured From Viewpoints Forming A Grid", which was filed on Mar. 31, 2005 and assigned Ser. No. 11/097,549, and subsequently issued on Nov. 28, 2006 as U.S. Pat. No. 7,142,209, was employed for this purpose.

It is also noted that it will often be the case that in warping the keyframe image, some portions of the scene visible from the viewpoint of the non-keyframe image are not visible from the viewpoint of the keyframe image. This being the case, the warped keyframe image will exhibit occlusion holes—i.e., pixels for which there are no YuvD values available. In order to prevent the encoded frame from exhibiting occlusion holes, the following procedure is used. In process action 504, pixels of the warped keyframe not having YuvD values are identified and a binary mask is generated, which for each pixel location has one binary value (e.g., 1) if YuvD pixel values are available and the other binary value (e.g., 0) if no YuvD values exist. The regions of the binary mask indicating there are no YuvD values available are then dilated by a prescribed number of pixels (e.g., 1 in tested embodiments) in process action 506. This is done to compensate for noise in the warping process that might otherwise cause occlusion holes to remain in the compressed frame. Next, the binary mask is divided into a grid of prescribed-sized blocks (process action 508). In tested embodiments, 16×16 pixel blocks were employed. A mode designation is then established for each block, which indicates if any of the binary mask "pixels" in that block have the second binary value associated with an occlusion hole (process action 510). In tested embodiments, a first binary value (e.g., 1) was used to indicate that a block had occlusion hole pixels in it and the second binary value (e.g., 0) was used to indicate there were no hole pixels.

Meanwhile, the pixel values of each pixel of the warped keyframe image are subtracted from the like-type values of the corresponding pixel of the non-keyframe image being compressed, to produce a difference image (process action 512). The non-keyframe image and the difference image are then segmented in blocks of the same size as that used to divide up the binary mask (process action 514), and in a prescribed order (e.g., raster order in tested embodiments) each block is each image is compressed. More particularly, an unselected block of the non-keyframe image is selected in the prescribed order (process action 516). In addition, a correspondingly located block of the difference image is selected (process action 518). It is then determined if the selected block is designated as including an occlusion hole pixel, or not, using the previously established designation mode for the block (process action 520). The selected block of the difference image is encoded using a modified version of the I-frame compression technique described previously in connection with the compression of certain keyframes, if it is found that the block is designated as not including any occlusion hole pixels (process action 522). These modifications involve skipping the DC prediction step since the DC components of the difference image will be small anyway. In addition, instead of using the standard encoding tables to encode the DC component (such as the MPEG4 Huffmann DC frequency component tables), the encoding tables meant for encoding the AC frequency components are used instead. Other than these changes the procedure is the same.

Alternately, if it is found that the block is designated as including occlusion hole pixels, the selected block of the non-keyframe image is encoded using a different modified version of the I-frame compression technique described previously in connection with the compression of the keyframes (process action 524). The modification in this case involves changing the DC prediction step of the compression process. When a non-keyframe is compressed in the manner described above, the decoded image will likely include some blocks taken directly from the non-keyframe image, rather than predicted from a close-by keyframe. These direct blocks are the blocks where an occlusion hole exists in the warped keyframe image. As will be described shortly, the decoding process for a direct block involves an inverse DC frequency component prediction step. As described previously in connection with compressing certain keyframes, DC frequency component prediction involves using DC component values from neighboring blocks to create a difference value that takes the place of the DC component. In the inverse step, the restored DC components of preceding blocks are used to restore the DC component of a block being decoded. However, in the compression scenario described above for the non-keyframe images, the preceding blocks may have been generated from the difference image as they did not include any occlusion hole pixels. This being the case, when restored, the frequency blocks will have the small DC frequency component associated with the transformed difference image. Thus, a problem exists in that the small DC frequency components associated with the transformed difference image blocks cannot be used effectively in the DC prediction step when compressing a direct block from the non-keyframe image. Additionally, adjacent blocks in the non-keyframe image cannot be used for DC component prediction purposes as they may not be associated with occlusion hole in the warped keyframe and so will not exist in the compressed image. The solution is to modify the previously-described I-frame compression technique such that when a block taken directly from the non-keyframe image being compressed is used, a mid-range DC frequency component value is used instead of the actual DC component from adjacent blocks when performing the DC component prediction step. This is if the adjacent block is not also a direct block. If it is a direct block, then the restored DC component can be used as it normally would in the compression procedure. Thus, as will be described shortly, when the compressed non-keyframe image is decompressed, it can use the mode designations, which are included in the compressed data, to identify which blocks are direct blocks. For direct blocks, it employs a modified I-frame decompression that uses prescribed mid-range DC frequency component values in the inverse DC component prediction step if an adjacent block needed in the procedure is not a direct block as well.

Regardless of whether the compressed block is a produced from a direct block or a difference image block, in process action 526, the appropriate block mode designation is appended to the compressed block data. It is then determined if all the blocks of the non-keyframe image being compressed have been processed (process action 528). If not, then process actions 516 through 528 are repeated until all the blocks are encoded, at which time the compression process ends for the non-keyframe under consideration.

1.2.1.4 Compression of Boundary Layer Data

As described previously, each component frame in each set of contemporaneously captured frames making up a "frame" of the interactive viewpoint video data is also represented by a boundary layer comprising pixels having assigned RGBAD values. These boundary layers are compressed using a non-predictive I-frame technique similar to that described above in connection with the compression of main layer keyframes, except sub-blocks associated with the A plane are added to the process and only those blocks with non-transparent pixels are encoded. This compression technique as it applies to the boundary layer data associated with a component frame will now be described in more detail.

Figure 6A:
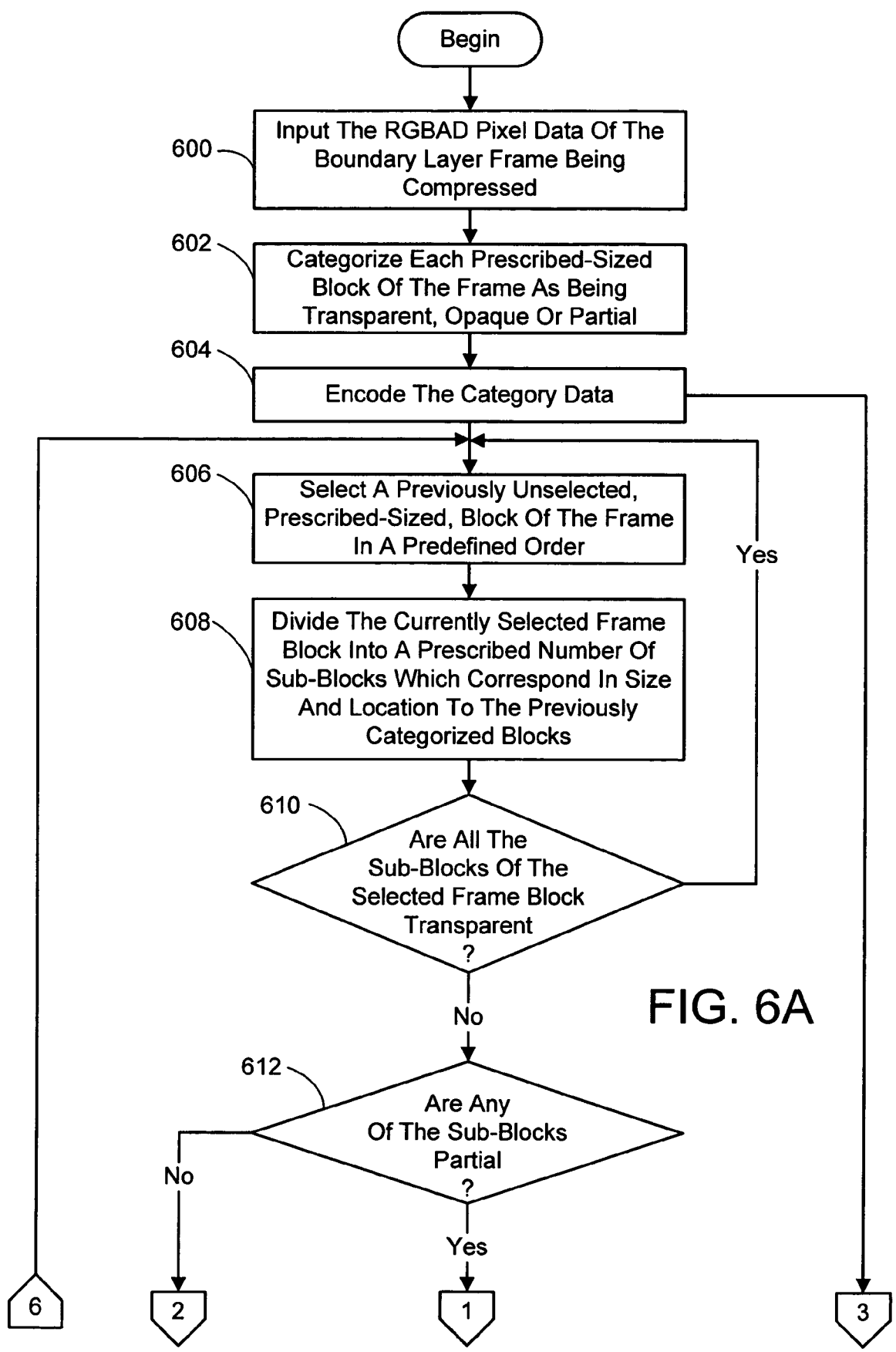
FIGS. 6A-C are a flow chart diagramming a process for compressing boundary layer data using a non-predictive I-frame compression technique according to the present invention.
Figure 6B:
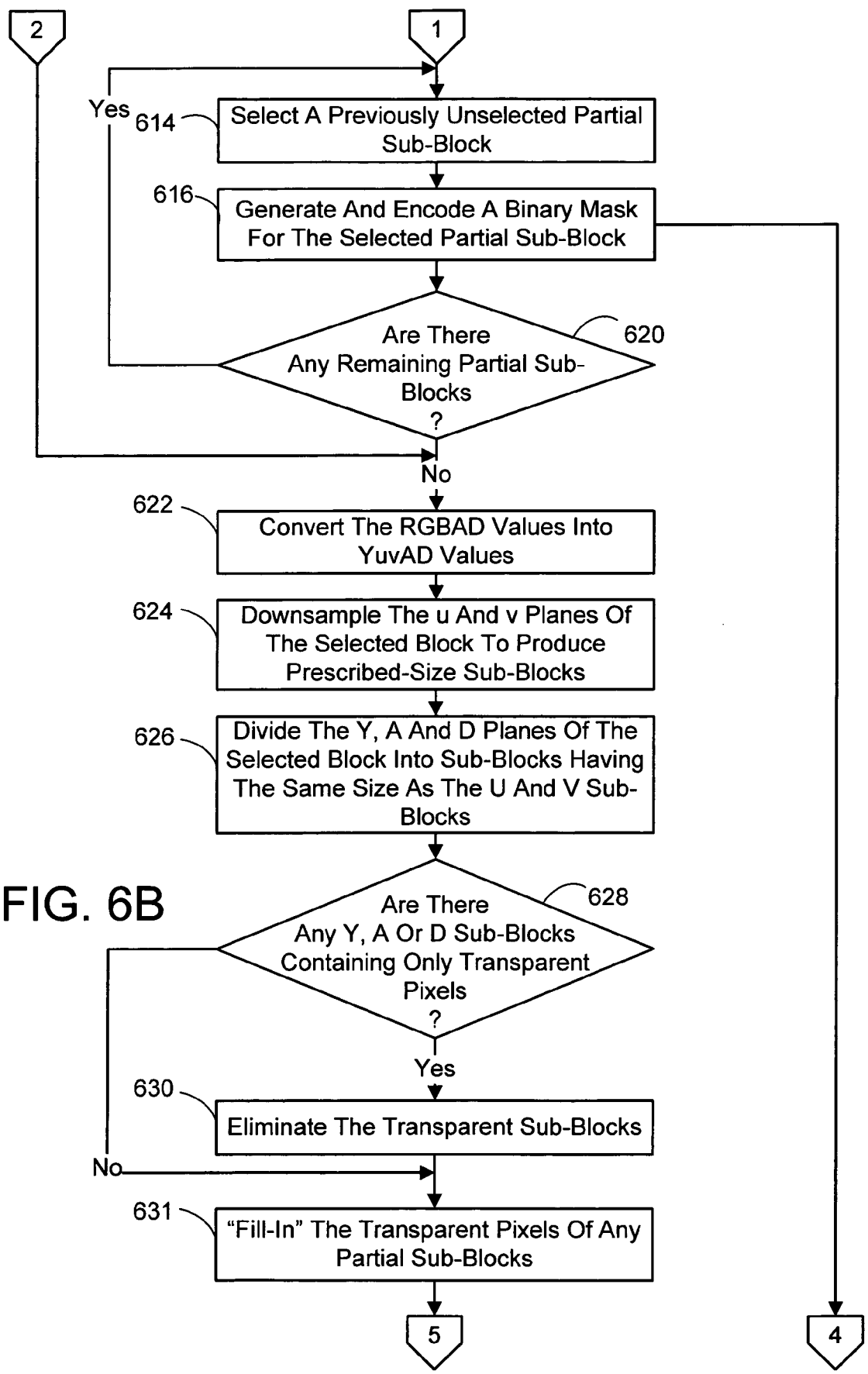
Figure 6C:
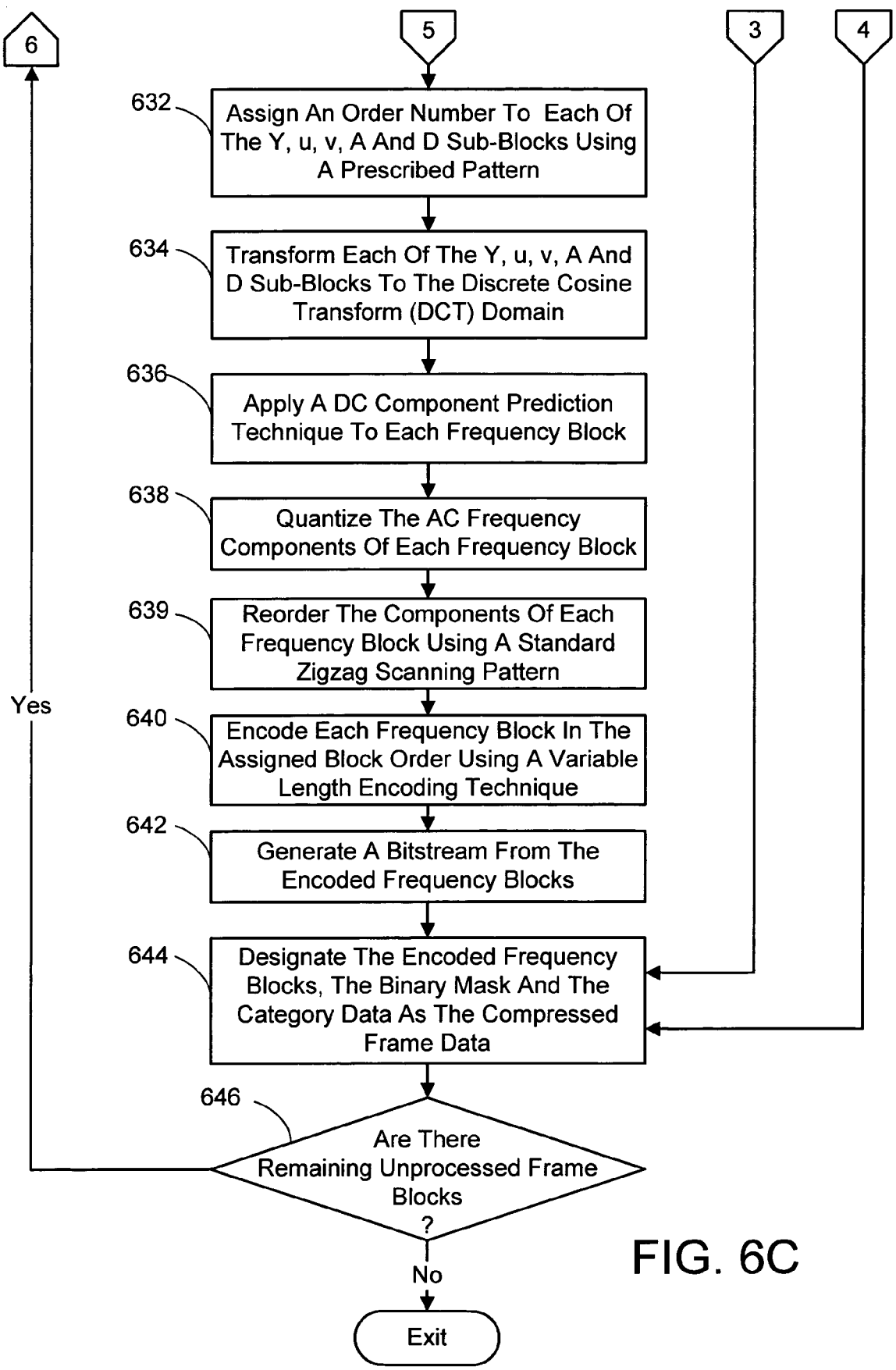

Referring to FIGS. 6A-C, the boundary layer compression process begins with a procedure to encode data specifying which prescribed-size blocks contain pixels that are all transparent (T), all opaque (O), or are partially transparent and partially opaque (hereinafter referred to a partial blocks (P)). To this end, in process action 600, the RGBAD pixel data of the boundary layer frame being compressed is input. Then, each prescribed-sized block of the image (e.g., 8×8 in tested embodiments) is categorized as being transparent, opaque or partial based on the A values by comparing each pixel against a fixed threshold value (process action 602). This category data is then encoded (process action 604). In tested embodiments, this encoding involves the use of quadtree & Huffman variable length coding techniques.

In regard to the quadtree procedure, this entails starting with the whole frame at a root level, and then:

(a) Generating a code indicating the category (which in the case of the root level is going to be a partial block). In tested embodiments, blocks categorized as being partial are represented by the smallest code number used (e.g., 0);

(b) If the last code generated is for a partial block, then the frame is divided into four quadrant sub-blocks;

(c) These sub-blocks are then sequentially selected in raster order, and for each a code is generated indicating its category (i.e., T, O or P);

(d) If a sub-block is found to be a partial block, before moving on to the next sub-block, steps (b) through (d) are repeated for the sub-block under consideration (rather than the frame as a whole), unless the sub-block is of a prescribed minimum size (i.e., 8×8 in tested embodiments).

The encoded quadtree data becomes part of the compressed boundary layer frame along with image data and other data that will be described next. However, it is noted that the categorizations of the aforementioned blocks are needed to generate this other data and so are retained for that purpose.

Once the block categorization data is encoded, the compression process continues with the selection of a previously unselected, prescribed-sized, block of the frame in a predefined order (process action 606). In tested embodiments, 16×16 pixel blocks were employed and selected in raster order. The currently selected frame block is divided into a prescribed number of sub-blocks which correspond to the size and location of the previously categorized blocks (process action 608). In tested embodiments, the frame blocks are divided into four 8×8 pixel quadrant sub-blocks.

Next, it is determined if all the sub-blocks of the selected frame block are categorized as being transparent (process action 610). If so, no code is generated, and process actions 606 through 610 are repeated for the next frame block. If any of the sub-blocks are not transparent, then it is determined if any of the sub-blocks are categorized as being partial blocks (process action 612). If so, then a previously unselected one of them is selected (process action 614). A binary mask is then generated for the selected partial sub-block and encoded (process action 616). This binary mask is generated by first performing the previously described quadtree procedure, except this time going down to a smaller prescribed sub-block level. In tested embodiments, this lowest prescribed level is a 2×2 pixel sub-block. However, rather than coding a lowest level sub-block as being partial, such a block is instead coded to indicate which pixels are opaque and which are transparent. Thus, one binary value is used to indicate an opaque pixel and the other binary value is used to indicate a transparent pixel. In tested embodiments, the aforementioned lowest level partial sub-block coding is a 4-bit code generated using a raster order. The resulting quadtree data is then encoded using an appropriate compression procedure, such as the MPEG4 Huffmann variable length encoding technique used in tested embodiments of the present invention. The encoded binary mask data for the selected partial sub-block also becomes part of the compressed frame as indicated in FIG. 6C.

It is then determined if there are any remaining partial sub-blocks in the selected frame block that have not yet been selected (process action 620). If so, process actions 614 through 620 are repeated for each of the remaining partial sub-blocks. If not, then the compression process continues as follows.

The selected frame block is encoded next. Essentially, this is done in the same way as previously described in connection with the encoding of the main layer I-frames, except that the A plane data is added and only non-transparent sub-blocks are encoded. Thus, the RGB values of the selected frame block are converted to Yuv values (process action 622), and the u and v planes are downsampled to produce u and v sub-blocks (process action 624). Further, the Y, D and now A planes are divided into sub-blocks that are the same size as the u and v sub-blocks (process action 626). At this point, it is determined if any of the Y, A or D sub-blocks contain only transparent pixels (process action 628). Preferably, the sub-block size is the same as that used to categorize the frame so that this categorization data can be used directly to make the foregoing determination. Any transparent sub-block is eliminated from consideration in process action 630. It is noted that since the frame block being considered will contain at least one opaque or partial sub-block, and since the u and v sub-blocks are downsampled versions of the frame block, they are automatically considered as being non-transparent sub-blocks.

To facilitate the encoding procedure to be described shortly, the transparent pixels of the partial sub-blocks for Y, u, v. A, or D are "filled-in" (process action 631). This can be done by, for example, using the MPEG4 standard's repetitive padding technique or by filling in with an average value based on those pixels which are non-transparent. The remaining sub-blocks (including the u and v sub-blocks) are next ordered in a prescribed pattern (process action 632). In tested embodiments, the ordering involved assigning a sequential number (e.g., 1, 2, 3 . . . ) to each sub-block starting with the non-transparent Y sub-blocks in raster order, and followed by the u and v sub-blocks. The non-transparent A sub-blocks are assigned order numbers next, followed by the non-transparent D sub-blocks, each in raster order.

The encoding then proceeds as described in connection with the encoding of the main layer keyframes. Namely, the ordered sub-blocks undergo DCT (process action 634), DC component prediction and differencing (process action 636), quantization (process action 638), component reordering (process action 639), coding (process action 640) and bitstream generation (process action 642). However, the procedure is modified in that the non-transparent A sub-block data is included in the processing and the CBP header is expanded to include a CBPA section that is coded in the same manner as the CBPY and CBPD sections. In addition, the CBPY, CBPA and CBPD sections indicate if a sub-block that would have been found in the data was eliminated because it was transparent. It is noted that since some of the neighboring sub-blocks needed in the DC prediction action may be eliminated transparent sub-blocks, a midrange DC component value appropriate for the application is substituted for the DC component of the missing sub-block.

The resulting encoded Y, u, v, A and D data then becomes part of the compressed boundary layer frame along with the encoded categorization data and the binary mask data, as shown in FIG. 6C, by the designation of this data as the compressed frame data (process action 644).

Next, it is determined if there are any remaining unselected frame blocks (process action 646). If so, process actions 606 through 646 are repeated for the remaining blocks, at which time the process ends.

1.2.2 Decompression

As indicated previously, the interactive viewpoint video allows a user to select a viewpoint from which he or she wishes to view the scene depicted in the current portion of the video. This user-selected viewpoint might coincide with one of the camera views, or more likely it will fall between camera views. Thus, only a limited amount of the data associated with the multiple, contemporaneously captured frames that make up each temporal frame set of the video will be needed to generate an image of the depicted scene from the selected viewpoint. This allows the video data to be selectively decoded and decompressed. Generally, just those portions of the incoming video data that are needed to render a current frame of the video from a vantage point selected by a user viewing the video, is decoded. In this way, the minimum amount of data possible must be handled, thereby speeding up the process and providing a quick rendering capability.

Once the needed video data is obtained, it is decoded. In general, the decompression processes associated with decoding the main layer and boundary layer data of a component frame encoded via the foregoing compression processes are just the reverse of these processes. However, some of the decompression processes do include unique actions. The decompression processes will now be described.

1.2.2.1 Decompression of Main Layer Keyframes

The decompression of encoded main layer keyframes that have been compressed using the previously described non-predictive I-frame technique is for the most part the reverse of the compression process with a few exceptions. This decompression process is generally accomplished by obtaining each portion of the datastream generated in the compression process that corresponds to a prescribed-sized block (e.g., 16×16 as in tested embodiments) of the frame being decoded, in the prescribed order in which they were encoded (e.g., raster order as in tested embodiments), and then decompressing each datastream portion.

Figure 7:
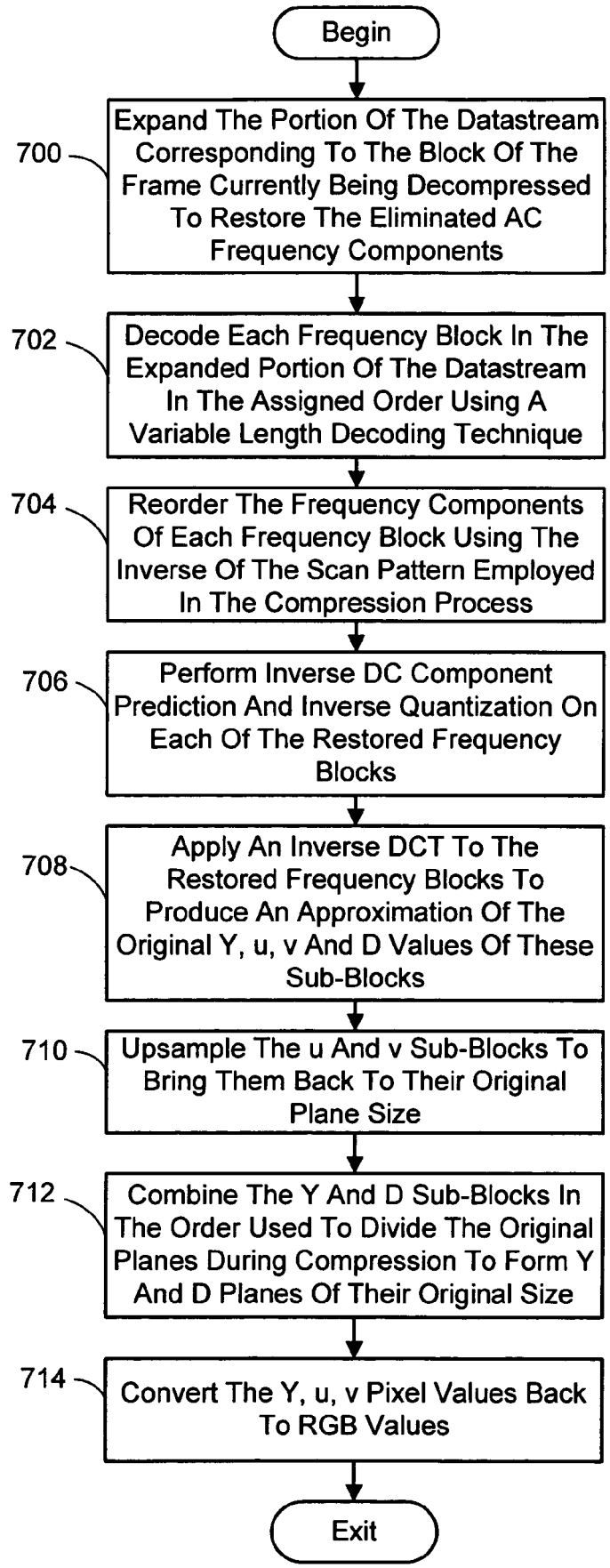
FIG. 7 is a flow chart diagramming a process for decompressing main layer keyframes using an I-frame decompression technique according to the present invention.

More particularly, referring to FIG. 7, for each portion of the datastream corresponding to an aforementioned block of the frame, the portion is expanded to restore the eliminated AC frequency components (process action 700). This entails adding zeros (e.g., 63 zeros in the case of an 8×8 frequency block) to the datastream in those places where the CBP header indicates that zero-valued AC components have been deleted from the encoded frequency block data. The expanded datastream portion is then decoded using the particular decoding procedure associated with the way it was encoded (process action 702). For example, if the MPEG4 variable length Huffman encoding scheme was employed, the MPEG4 Huffman decoding procedure would be used to decode the datastream. Next, the inverse of the scan pattern employed in the compression process to reorder the frequency components of each frequency block (if any) is applied to restore the components to their original order (process action 704). For example, if a zigzag pattern was employed as in the tested embodiments of the present invention, an inverse zigzag scan pattern would be used to restore the original component order.

Inverse DC component prediction and quantization procedures are then performed on each of the restored frequency blocks (process action 706). In tested embodiments, this is accomplished using the inverse switched DC prediction technique and inverse quantization technique (in a similar manner to MPEG-4). The result of this action is to restore the original DC component to each frequency block. Next, an inverse of the DCT performed on the original Y, u, v and D sub-blocks is applied to the restored frequency blocks to produce an approximation of the original Y, u, v and D values of these sub-blocks (process action 708). The resulting u and v sub-blocks are upsampled to bring them back to their original plane size (e.g., 16×16 in tested embodiments) in process action 710. In addition, in process action 712, the Y and D sub-blocks are combined in the order used to divide the original planes during compression (e.g., raster order in tested embodiments) to form Y and D planes of their original size (e.g., 16×16 in tested embodiments).

Finally, the Y, u and v pixel values are converted back to RGB values using standard methods (process action 714) and the decompression process ends. The result is a restored block of pixels of the prescribed size (e.g., 16×16), each pixel of which has R, G, B, and D values assigned to it.

1.2.2.2 Decompression of Main Layer Keyframes using P-Frames

The decompression of the main layer keyframes in each contemporaneous frame set compressed using the previously-described P-frame procedure, is accomplished using conventional inter-frame decompression techniques. In tested embodiments this involved the use of the P-frame recovery approach of the MPEG4 standard. The only modification to this approach was the recovery of the disparity values (D) since the main frame pixel data included this data. The D data is recovered in the same way as it was in the I-frame decompression procedure described previously in that it is handled just like the recovery of the Y data.

1.2.2.3 Decompression of Non-Keyframe Main Layers

Figure 8A:
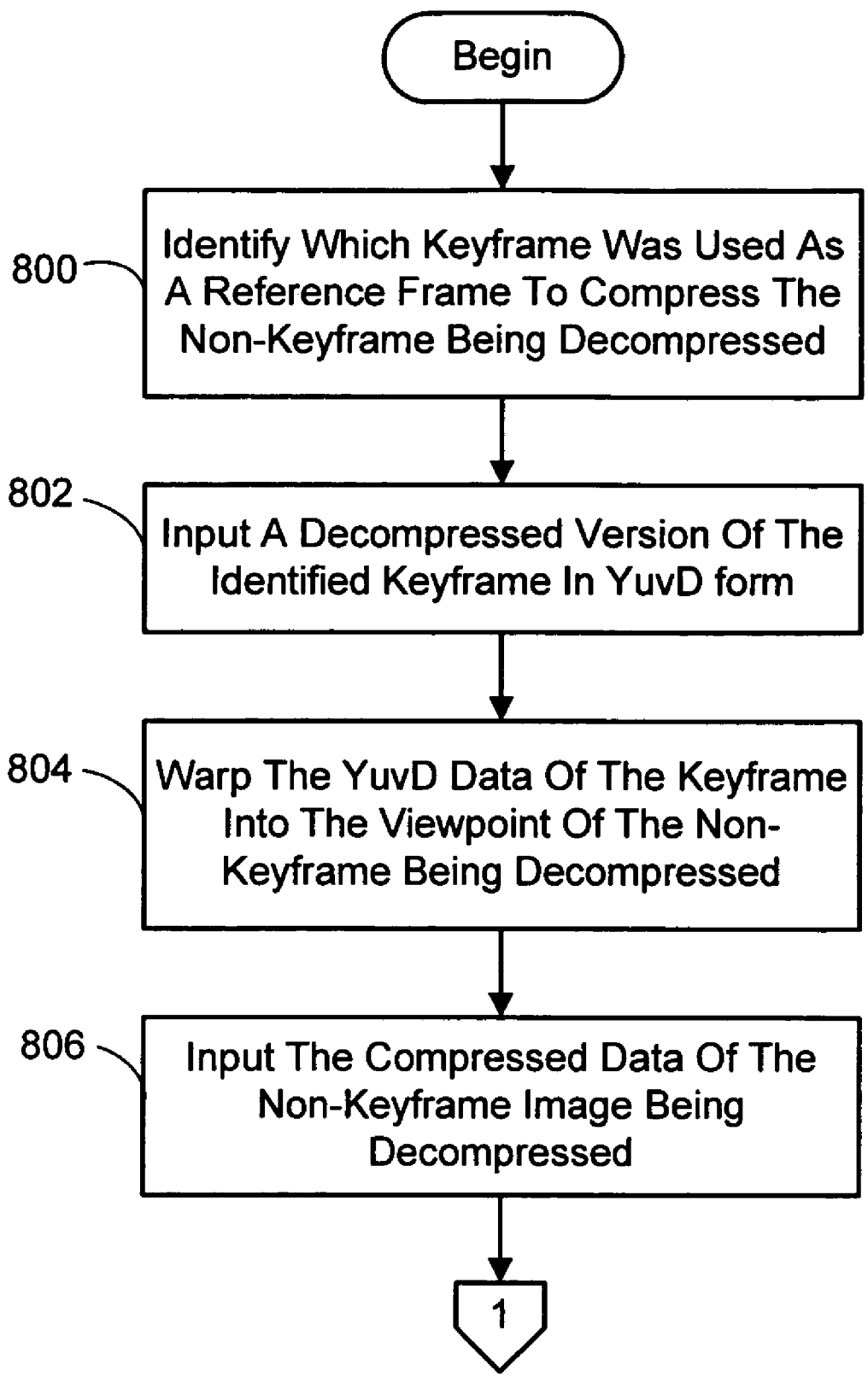
FIGS. 8A and 8B are a flow chart diagramming a process for decompressing main layer non-keyframe images using a spatial decompression technique according to the present invention.
Figure 8B:
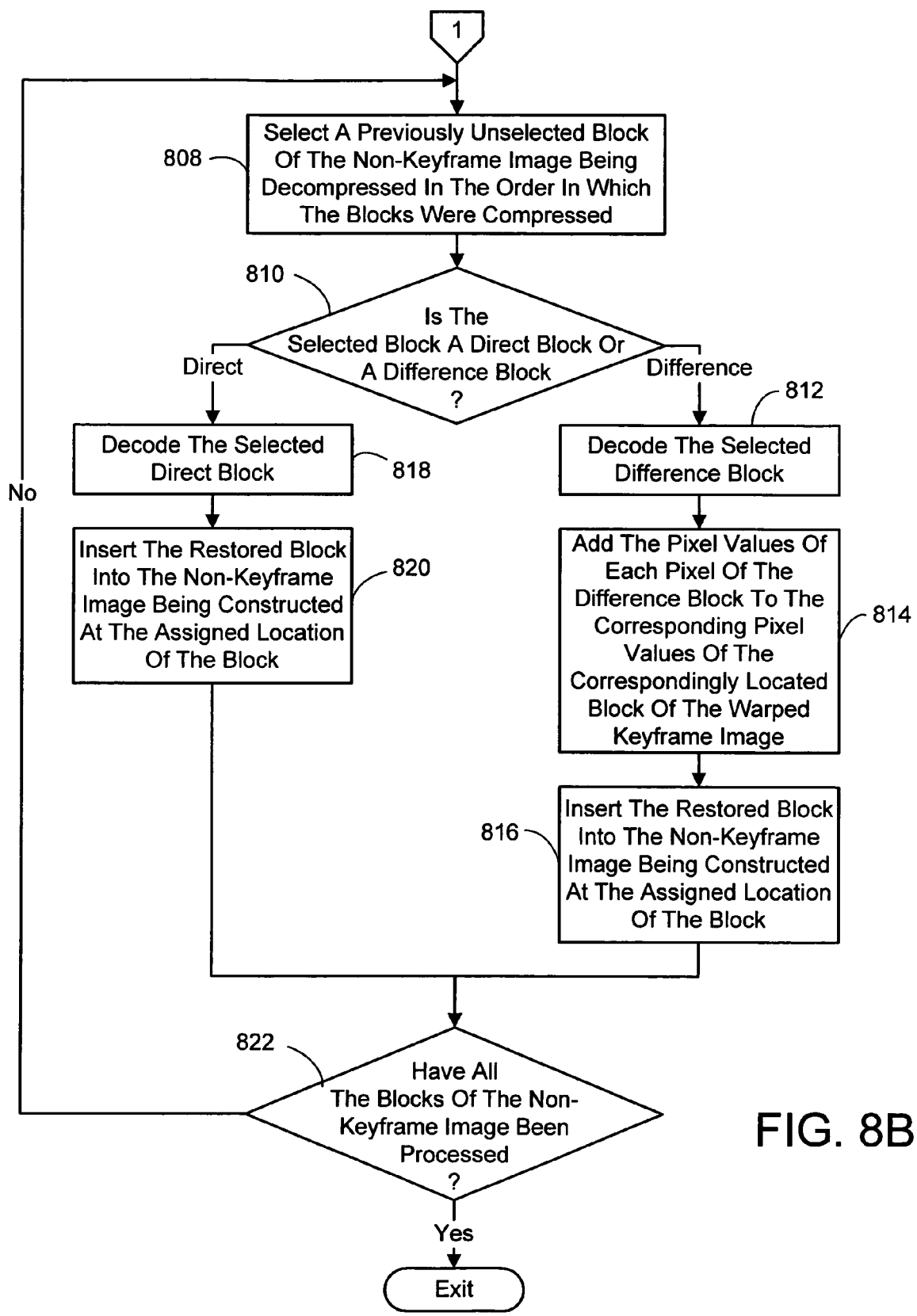

The decompression of the encoded main layer of non-keyframes that have been compressed using the previously-described spatial prediction compression technique will now be presented. As described previously, the non-keyframe images of each set of contemporaneous frames are decompressed using a decompressed keyframe of the set that was employed as a reference frame in compressing the non-keyframe image under consideration. In particular, referring to FIGS. 8A-B, for each non-keyframe in each set of contemporaneous frames, it is first determined which keyframe of the set (if there are more than one) was used as its reference frame (process action 800). A decompressed version of this keyframe is then input (process action 802) with its pixel data in YuvD form. The disparity data (D) of the keyframe, and the camera parameters (which are included in the compressed video data) of the cameras used to capture the keyframe and the non-keyframe being decompressed, are then used to transform both the texture and disparity data (YuvD) into the viewpoint of the non-keyframe being decompressed (process action 804). As with the compression of the non-keyframe images, the process used to "warp" the main layer of the keyframe to the viewpoint of the non-keyframe being decompressed is accomplished using conventional methods.

Meanwhile, the compressed non-keyframe image data associated with the non-keyframe being decompressed is input (process action 806). As discussed in connection with the compression of the non-keyframe data, a block mode designator for each prescribed-sized block of the image is included in the non-keyframe data. A previously unselected block of the non-keyframe being decompressed is then selected in a prescribed order matching the order the blocks were compressed (process action 808). A raster order was used in tested embodiments. It is next determined if the selected block is a direct block or a difference image block using the block mode designator included with in the block data (process action 810). If it is found that the selected block is a difference image block, it is decoded using a modified version of the I-frame decompression technique described previously in connection with the decompression of certain keyframes, (process action 812). These modifications involve skipping the inverse DC prediction step as the prediction procedure was not done in compressing the data. In addition, instead of using the standard decoding tables to decode the DC component (such as the MPEG4 Huffmann DC frequency component tables), the decoding tables meant for decoding the AC frequency components are used instead. Other than these changes, the decompression procedure is the same.

Once decoded, the pixel values of each pixel of the difference block are added to corresponding pixel values of the correspondingly located block of the decoded and warped keyframe image (process action 814). The result of this last action is a restored approximation of the selected block of the non-keyframe image. This restored block is then inserted into the decompressed frame being constructed at the assigned location of that block (process action 816). This location can be determined by the order in which the blocks were compressed.

If, however, it is found that the selected block is a direct block, it is decoded using a different modified version of the I-frame decompression technique (process action 818). The modification in this case involves changing the inverse DC prediction step of the decompression process. More particularly, in performing the inverse DC frequency component prediction step, it is first determined whether each of the adjacent blocks that are to be used to restore the DC frequency component of the direct block being decompressed is a direct block or a difference block, respectively. If the adjacent block is a direct block, its DC frequency component is employed as is normally done in the inverse DC frequency component prediction step. However, if the adjacent block is a difference block, its DC component is ignored and instead a prescribed mid-range DC frequency component value is employed in the inverse step. Once the selected direct block has been decoded it is used to construct part of the decompressed non-keyframe image. More particularly, in process action 820, the decoded block is inserted into the decompressed frame being constructed at the assigned location of that block (as can be determined by the order in which the blocks were compressed—such as raster order in tested embodiments).

It is next determined if all the blocks of the non-keyframe image being decompressed have been processed (process action 822). If not, then process actions 808 through 822 are repeated until all the blocks are decoded, at which time the decompression process end. The result is a restored approximation of the original non-keyframe image.

1.2.2.4 Decompression of Boundary Layer Data

Figure 9A:
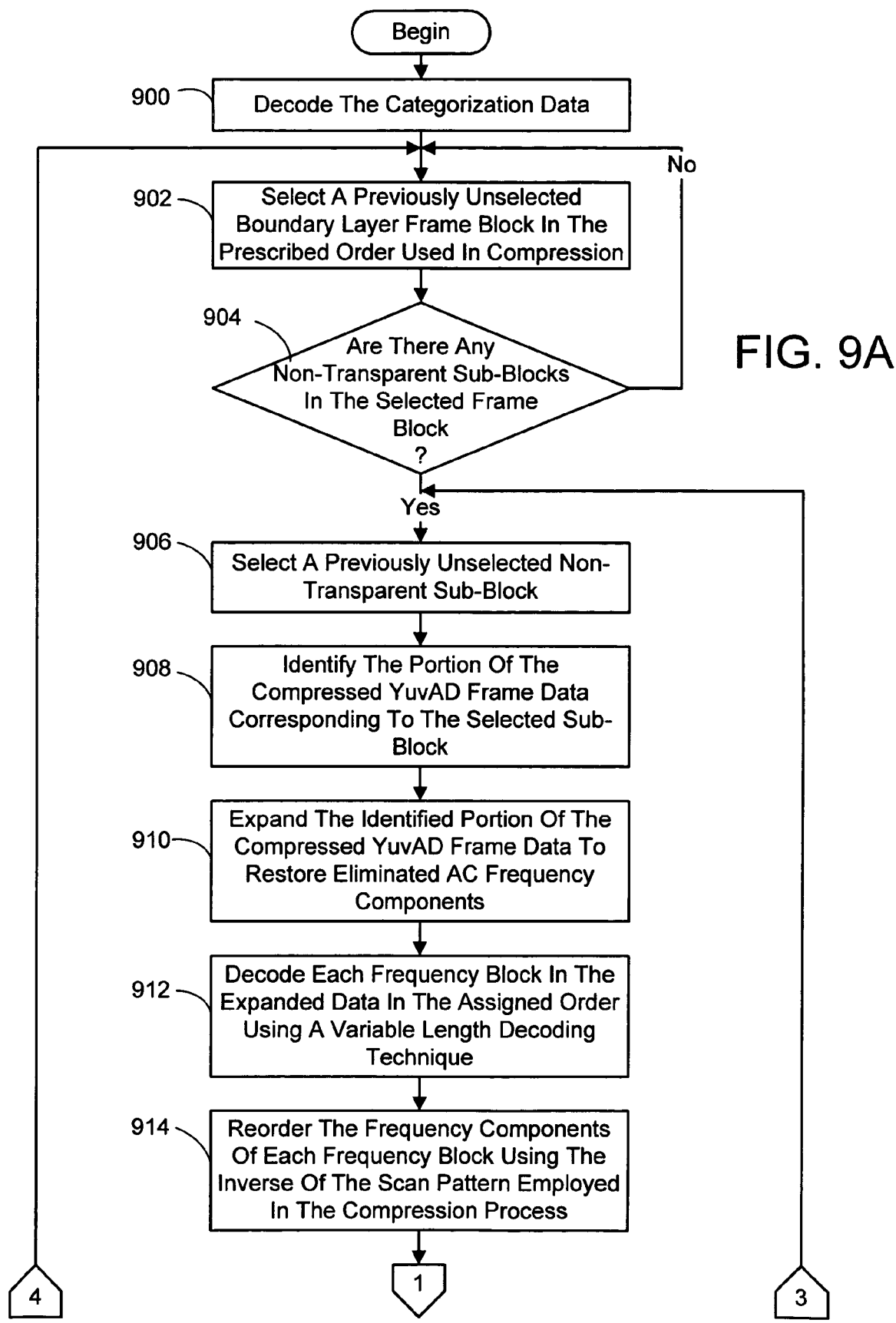
FIGS. 9A-C are a flow chart diagramming a process for decompressing boundary layer data using an I-frame compression technique according to the present invention.
Figure 9B:
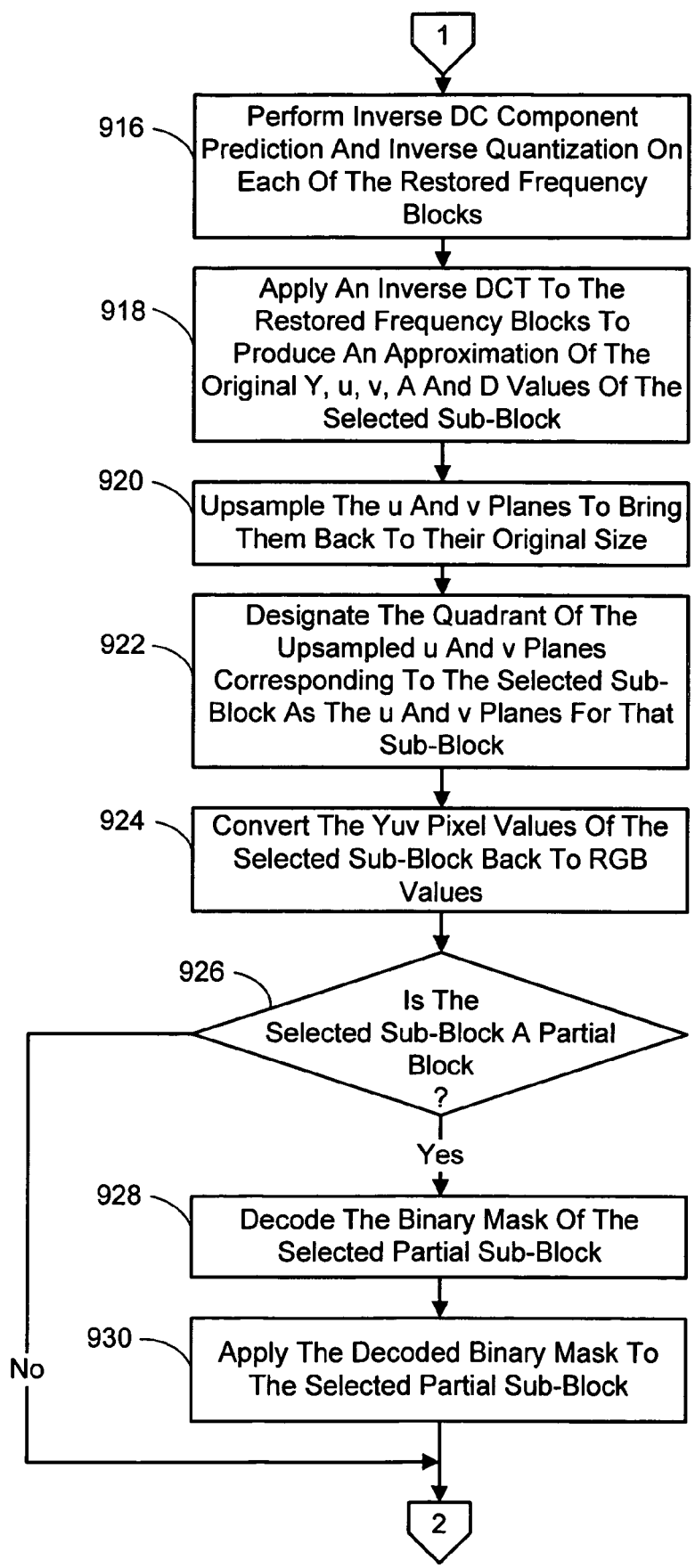
Figure 9C:
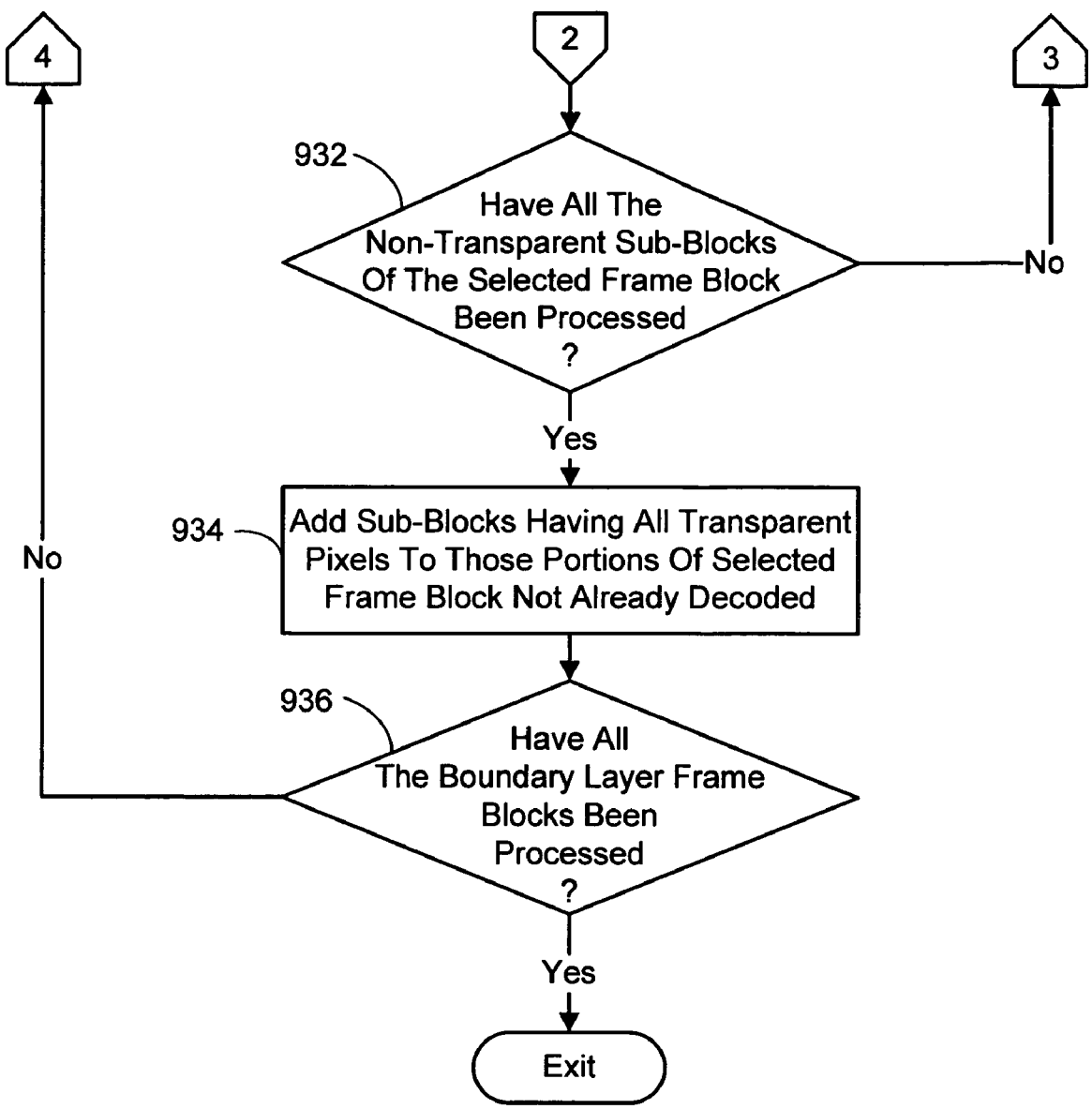

The decompression of encoded boundary layers that have been compressed using the previously described non-predictive I-frame approach will now be presented. Referring to FIGS. 9A-C, the decompression process begins by decoding the categorization data included in the compressed frame data (process action 900). This entails applying the particular decoding procedure applicable to the procedure used to compress the categorization data (e.g., a Huffmann encoding technique in the tested embodiments), and then performing an inverse quadtree procedure to obtain the category (i.e., T, O or P) assigned to each of the prescribed sized blocks used in the compression process (e.g., 8×8 in tested embodiments).

As described previously, the compression of boundary layer frames includes eliminating the transparent sub-blocks prior to encoding. The decoded categorization data is used to identify these eliminated sub-blocks so that they can eventually be restored and to identify the order in which sub-blocks are to be found in the encoded YuvAD data. To this end, in process action 902, a previously unselected frame block of the same size employed in the compression process is selected in a prescribed order used in the compression. In tested embodiments, the frame blocks were each 16×16 pixels and a raster order was used. It is then determined from the categorization data if there are any non-transparent sub-blocks of the size used in the compression process contained in the selected block (process action 904). In tested embodiments, the sub-blocks were 8×8 quadrant blocks. If there are no non-transparent sub-blocks found, then process actions 902 and 904 are repeated. When a frame block having non-transparent sub-blocks is found, a previously unselected one of its non-transparent sub-block(s) is selected, and in the order used in compression (e.g., raster order in tested embodiments) if there are more than one (process action 906). The portion of the compressed YuvAD data corresponding to the selected sub-block is then identified using the CBP header of the frame block under consideration (process action 908).

At this point, the decompression procedure becomes similar to that used to decode main layer keyframes that were compressed using the non-predictive I-frame technique. More particularly, the identified portion of compressed data is first expanded by adding zeros whenever the CBP header associated with the frame block under consideration indicates that zero-value AC components have been deleted from the encoded frequency block data associated with the selected sub-block (process action 910). The expanded data is then decoded in process action 912 using the particular decoding procedure appropriate for the type of encoding used (e.g., Huffmann encoding in tested embodiments). The inverse of the scan pattern employed in the compression process (e.g., inverse zigzag in tested embodiments) is used to reorder the decoded frequency components to reproduce the original frequency block (process action 914). Inverse DC component prediction and inverse quantization procedures are then performed (process action 916) to produce the original DC component of the selected frequency block. Next, an inverse DCT is performed to produce an approximation of the original Y, u, v, A and D values of the selected sub-block (process action 918). The resulting u and v sub-block planes are upsampled to bring them back to their original size (e.g., 16×16) in process action 920. The quadrant of the upsampled u and v planes corresponding to the selected sub-block is then designated as the u and v planes for that sub-block (process action 922). Thus, at this point in the decompression process there are Y, u, v, A and D values decoded for each pixel of the selected sub-block.

Next, the Yuv pixel values of the selected sub-block are converted back to RGB values (process action 924) so that RGBAD values are specified for each pixel of the sub-block. It is then determined if the selected sub-block is categorized as a partial block (process action 926). In compressing the boundary layer data the partial sub-blocks were put through a repetitive padding technique as described previously. To remove this extraneous data, the binary mask generated for the sub-block and included in the compressed frame data is reproduced using a decoding procedure appropriate for the type of encoding used in the compression process (e.g., Huffmann encoding in tested embodiments) followed by an inverse quadtree procedure (process action 928). The decoded mask is then applied to the selected partial sub-block such that all the non-opaque pixels are made transparent (process action 930).

It is then determined if all the non-transparent sub-blocks of the selected frame block have been processed (process action 932). If not, process actions 906 through 932 are repeated for each remaining non-transparent sub-block. At this point, all the non-transparent sub-blocks of the selected frame block have been decompressed. As it is known that any other sub-blocks of the frame block are totally transparent, in process action 934, sub-blocks having all transparent pixels are added. It is then determined if all the frame blocks of the boundary layer frame being decompressed have been processed (process action 936). If not, process actions 902 through 936 are repeated until all the frame blocks have been considered. The decompression process then ends.

2.0 REFERENCES

[1] Carranza, J., Theobalt, C., Magnor, M. A., and Seidel, H.-P. 2003. Free-viewpoint video of human actors. *ACM Transactions on Graphics* 22, 3 (July), 569-577.
[2] Chang, C.-L., et al. 2003. Interview wavelet compression of light fields with disparity-compensated lifting. In *Visual Communication and Image Processing (VCIP* 2003).
[3] Gortler, S. J., Grzeszczuk, R., Szeliski, R., and Cohen, M. F. 1996. The Lumigraph. In *Computer Graphics (SIGGRAPH'96) Proceedings*, ACM SIGGRAPH, 43-54.
[4] Kanade, T., Rander, P. W., and Narayanan, P. J. 1997. Virtualized reality: constructing virtual worlds from real scenes. *IEEE MultiMedia Magazine* 1, 1 (January-March), 34-47.
[5] Levoy, M., and Hanrahan, P. 1996. Light field rendering. In *Computer Graphics (SIGGRAPH'96) Proceedings*, ACM SIGGRAPH, 31-42.
[6] Wilburn, B., Smulski, M., Lee, H. H. K., and Horowitz, M. 2002. The light field video camera. In *SPIE Electronic Imaging: Media Processors*, vol. 4674, 29-36.
[7] Yang, J. C., Everett, M., Buehler, C., and McMillan, L. 2002. A real-time distributed light field camera. In *Eurographics Workshop on Rendering*, P. Debevec and S. Gibson, Eds., 77-85.
[8] Ziegler, G., Lensch, H., Ahmed, N., Magnor, M., and Seidel, H.-P. 2004. MPI Informatik, Saarbrucken, Germany Wherefore, what is claimed is:

1. A computer-implemented process for compressing video data comprising sequential sets of contemporaneous video frames wherein the video frames in a set depict substantially the same scene from different viewpoints arranged in a grid of viewpoints, and each frame of which is represented by at least a main layer and a boundary layer, said process comprising:

using a computer to perform the following process actions:
designating one or more keyframes for each set of contemporaneous frames such that each designated keyframe in any one set of contemporaneous frames has a viewpoint among the different viewpoints arranged in a grid of viewpoints that is the same as a designated keyframe in all the other sets of contemporaneous frames; and
for each set of contemporaneous video frames in time sequence order,
compressing the main layer of each keyframe using an inter-frame compression technique;
compressing the main layer of each non-keyframe using a spatial prediction compression technique; and
compressing the boundary layer of each frame using an intra-frame compression technique.

2. The process of claim 1, wherein each frame of each set of contemporaneous frames is represented by said main layer whose pixels are characterized by pixel color values and pixel disparity or depth values and said boundary layer whose pixels are characterized by pixel color values, pixel alpha values and pixel disparity or depth values, and wherein the process action of compressing the main layer of each keyframe in each set of contemporaneous frames using an inter-frame compression technique, comprises the actions of:

compressing the main layer of each keyframe using a non-predictive I-frame compression technique that encodes at a minimum, pixel color values, as well as pixel disparity or depth values, for the first video frame set and other subsequent frame sets on a prescribed periodic basis; and compressing the main layer of each keyframe using a temporal prediction compression technique, based on the main layer of the keyframe exhibiting the same viewpoint in a preceding frame set, which encodes at a minimum pixel color values, as well as pixel disparity or depth values, for each frame set whose keyframe or keyframes are not compressed using said non-predictive I-frame compression technique.

3. The process of claim 2, wherein the process action of compressing the main layer of each non-keyframe within each set of contemporaneous frames, comprises the action of compressing said main layer of each non-keyframe within each set of contemporaneous frames using a spatial prediction compression technique that encodes at a minimum, pixel color values, as well as pixel disparity or depth values.

4. The process of claim 3, wherein the process action of designating one or more keyframes for each set of contemporaneous frames comprises the action of designating said one or more keyframes such that no frame in a set has a viewpoint that is more than a prescribed number of viewpoints away from the viewpoint of a designated keyframe in any direction on the grid, and wherein the process action of compressing the main layer of each non-keyframe within each set of contemporaneous frames comprises the action of using the main layer of a keyframe position frame which is no more than said prescribed number of viewpoints away from the main layer being compressed as a reference frame for the spatial prediction compression technique.

5. The process of claim 2, wherein the process action of compressing the boundary layer of each frame in each frame set, comprises the action of compressing the boundary layer of each frame in each frame set using a non-predictive I-frame compression technique that encodes at a minimum, pixel color values, pixel disparity or depth values, and pixel alpha values.

6. The process of claim 2, wherein the process action of compressing the main layer of each keyframe using a temporal prediction compression technique for each frame set whose keyframe or keyframes are not compressed using the non-predictive I-frame compression technique, comprises an action of using the P-frame generation approach of the MPEG4 standard modified to include the pixel disparity or depth values.

7. The process of claim 3, wherein the process action of compressing said main layer of each non-keyframe within each set of contemporaneous frames using a spatial prediction compression technique, comprises the actions of:

identifying a keyframe within a prescribed number of viewpoints from the non-keyframe being compressed;

inputting the pixel data of the identified keyframe;

converting the pixel color values of the identified keyframe into Yuv values;

inputting camera parameters indicative of the location, orientation and camera attributes of the cameras used to capture the identified keyframe and the non-keyframe being compressed;

warping the identified keyframe into the viewpoint of the non-keyframe being decompressed using the disparity of depth values (D) of the identified keyframe and the camera parameters of the cameras used to capture the keyframe and the non-keyframe being decompressed;

identifying pixels of the warped keyframe not having YuvD values;

generate a binary mask which for each pixel location of the warped keyframe has one binary value if YuvD pixel values are available and the other binary value if no YuvD values exist;

dilating the regions of the binary mask indicating there are no YuvD values available by a prescribed number of pixels;

dividing the binary mask into a grid of prescribed-sized blocks;

establishing a mode designation for each block, which indicates if any of the binary mask pixels in that block have the second binary value associated with a region wherein no YuvD values exist;

subtracting the pixel values of each pixel of the warped keyframe from the like-type values of the corresponding pixels of the non-keyframe image being compressed, to produce a difference image;

segmenting the non-keyframe and the difference image in blocks of the same size as that used to divide the binary mask; and for each correspondingly located block of the non-keyframe and difference image, considered in a prescribed order, determining if the block is associated with a region of the warped keyframe comprising pixels with no YuvD values using the mode designation of the block, whenever it is found that the block is associated with a region of the warped keyframe comprising pixels with no YuvD values, encoding the block of the non-keyframe using a version of an I-frame compression technique in which a DC frequency component prediction phase uses prescribed mid-range DC frequency component values in lieu of actual values associated with adjacent blocks whenever the adjacent block's pixels all have YuvD values, whenever it is found that the block is associated with a region of the warped keyframe comprising pixels all having YuvD values, encoding the block of the difference image using a version of an I-frame compression technique in which a DC frequency component prediction phase is skipped and AC frequency component encoding tables are used to encode the DC frequency component, and appending the mode designation of the block to the encoded block data.

8. A computer-readable storage medium having computer-executable instructions stored thereon for performing the process actions recited in claim 1.

9. A computer-implemented process for decompressing video data comprising sequential sets of contemporaneous video frames wherein the video frames of a set depict substantially the same scene from different viewpoints arranged in a grid of viewpoints, and each frame of which is represented by at least a main layer and a boundary layer, wherein said video data has been compressed by, designating one or more keyframes for each set of contemporaneous frames such that each designated keyframe in any one set of contemporaneous frames has a viewpoint that is the same as a designated keyframe in all the other sets of contemporaneous frames, compressing the main layer of each keyframe in each set of contemporaneous frames using an inter-frame compression technique, compressing the main layer of each non-keyframe within each set of contemporaneous frames using a spatial prediction compression technique, and compressing the boundary layer of each frame in each frame set using an intra-frame compression technique, said process comprising:
  using a computer to perform the following process actions:
  decompressing the boundary layer of each frame in each of said sets of contemporaneous frames, each set of which depicts substantially the same scene from different viewpoints arranged in a grid of viewpoints, using an intra-frame decompression technique;
  decompressing the main layer of each keyframe in each of said sets of contemporaneous frames using an inter-frame decompression technique; and
  decompressing the main layer of each non-keyframe within each of said sets of contemporaneous frames using a spatial prediction decompression technique.

10. The process of claim 9, wherein each frame of each set of contemporaneous frames is represented by said main layer whose pixels are characterized by pixel color values and pixel disparity values and said boundary layer whose pixels are characterized by pixel color values, pixel alpha values and pixel disparity values, and wherein the process action of decompressing the main layer of each keyframe in each set of contemporaneous frames using an inter-frame decompression technique, comprises the actions of:
  decompressing the main layer of each keyframe using a non-predictive I-frame compression technique that recovers at a minimum, approximations of the original pixel color values, as well as pixel disparity or depth values, for the first video frame set and other subsequent frame sets on a prescribed periodic basis; and
  decompressing the main layer of each keyframe using a temporal prediction decompression technique, based on the main layer of the keyframe exhibiting the same viewpoint in another frame set, which recovers at a minimum, approximations of the original pixel color values, as well as pixel disparity or depth values, for each frame set whose keyframe or keyframes are not compressed using said non-predictive I-frame compression technique.

11. The process of claim 10, wherein the process action of decompressing the main layer of each non-keyframe within each set of contemporaneous frames using a spatial prediction decompression technique, comprises the action of decompressing said main layer of each non-keyframe within each set of contemporaneous frames using a spatial prediction decompression technique which recovers at a minimum, approximations of the original pixel color values, as well as pixel disparity or depth values.

12. The process of claim 11, wherein the one or more keyframes designated for each set of contemporaneous frames are designated such that no frame in a set has a viewpoint that is more than a prescribed number of viewpoints away from the viewpoint of a designated keyframe in any direction on the grid, and wherein the process action of decompressing the main layer of each non-keyframe within each set of contemporaneous frames comprises the action of using the main layer of a keyframe position frame which is no more than said prescribed number of viewpoints away from the main layer being decompressed as a reference frame for the spatial prediction decompression technique.

13. The process of claim 10, wherein the process action of decompressing the boundary layer of each frame in each frame set using a intra-frame decompression technique, comprises the action of decompressing the boundary layer of each frame in each frame set using a non-predictive I-frame decompression technique which recovers at a minimum, approximations of the original pixel color values, pixel disparity or depth values, and pixel alpha values.

14. The process of claim 10, wherein the process action of decompressing the main layer of each keyframe using a temporal prediction decompression technique for each frame set whose keyframe or keyframes are not compressed using said non-predictive I-frame compression technique, comprises an the action of using the P-frame decompression approach of the MPEG4 standard modified to include the recover of pixel disparity or depth values.

15. The process of claim 11, wherein the process action of decompressing said main layer of each non-keyframe within each set of contemporaneous frames using a spatial prediction decompression technique, comprises the actions of:
  identifying a keyframe in the set of contemporaneous frames that was employed as a reference frame during the compression of the non-keyframe being decompressed;
  inputting a decompressed version of the identified keyframe with its pixel data in YuvD form;
  inputting camera parameters indicative of the location, orientation and camera attributes of the cameras used to capture the identified keyframe and the non-keyframe being decompressed;
  warping the identified keyframe into the viewpoint of the non-keyframe being decompressed using the disparity of depth values (D) of the identified keyframe and the camera parameters of the cameras used to capture the keyframe and the non-keyframe being decompressed;
  inputting compressed data associated with the non-keyframe being decompressed which comprises a mode designator for each prescribed-sized block of the non-keyframe that indicates if any of the pixels in a correspondingly located block of the warped keyframe have no YuvD values;
  for each block of the non-keyframe being decompressed, considered in a prescribed order matching the order in which the blocks were compressed,
    whenever the mode designator for the block indicates the correspondingly located block of the warped keyframe has YuvD values for every pixei thereof, decoding the block using a modified version of an I-frame decompression technique in which an inverse DC frequency component prediction step is skipped and AC frequency component decoding tables are used to decode the DC frequency component, and then adding the pixel values of each pixel of the decoded block to corresponding pixel values of a correspondingly located block of the warped keyframe,
    whenever the mode designator for the block indicates the correspondingly located block of the warped keyframe has pixels with no YuvD values, decoding the block using a different modified version of an I-frame decompression technique in which a DC frequency component prediction phase uses prescribed mid-range DC frequency component values in lieu of actual values associated with adjacent blocks if the adjacent block's pixels all have YuvD values, and
    assigning the decoded block to a location in the decompressed non-keyframe corresponding to its location in the original non-keyframe.

16. A computer-readable storage medium having computer-executable instructions stored thereon for performing the process actions recited in claim 9.

* * * * *